US011975299B2

(12) United States Patent
Schleifenbaum

(10) Patent No.: US 11,975,299 B2
(45) Date of Patent: May 7, 2024

(54) APPARATUS FOR CUSTOMIZED PRODUCTION OF A FLAVORING AGENT MIX

(71) Applicant: Firmenich SA, Satigny (CH)

(72) Inventor: Birgit Schleifenbaum, Geneva (CH)

(73) Assignee: Firmenich SA, Satigny (CH)

( * ) Notice: Subject to any disclaimer, the term of this patent is extended or adjusted under 35 U.S.C. 154(b) by 682 days.

(21) Appl. No.: 17/045,040

(22) PCT Filed: Apr. 30, 2019

(86) PCT No.: PCT/EP2019/061067
§ 371 (c)(1),
(2) Date: Oct. 2, 2020

(87) PCT Pub. No.: WO2019/211281
PCT Pub. Date: Nov. 7, 2019

(65) Prior Publication Data
US 2021/0146322 A1 May 20, 2021

(30) Foreign Application Priority Data
Apr. 30, 2018 (EP) .................................... 18170055

(51) Int. Cl.
*B01F 13/10* (2006.01)
*B01F 15/06* (2006.01)
(Continued)

(52) U.S. Cl.
CPC ............ *B01F 33/846* (2022.01); *B01F 35/92* (2022.01); *B01F 33/848* (2022.01); *B01F 35/1452* (2022.01); *B01F 2035/98* (2022.01)

(58) Field of Classification Search
CPC ...... B01F 33/846; B01F 35/92; B01F 33/848; B01F 35/1452; B01F 2035/98
See application file for complete search history.

(56) References Cited

U.S. PATENT DOCUMENTS 4,335,759 A * 6/1982 Pattiniemi .............. B44D 3/003 220/203.01
6,793,387 B1 * 9/2004 Neas ..................... B01F 33/841 222/106
(Continued)

*Primary Examiner* — Michael Collins
(74) *Attorney, Agent, or Firm* — Robert S. Dailey

(57) ABSTRACT

Apparatus (100, 200, 300, 400, 500, 600) for customized production of a flavoring agent, the apparatus too, (200, 300, 400, 500, 600) comprising: a retainer (110, 210, 310, 610) for retaining at least two containers (10), each container (10) comprising a respective flavoring agent; a collecting and dispensing unit, e.g. a manipulator (120, 220, 320), for collecting and dispensing flavoring agents; a mixer (130, 230, 330) for mixing flavoring agents for obtaining a new flavoring agent; a control-unit (140) for controlling at least the collecting and dispensing unit (120, 220, 320) and the mixer (130, 230, 330), and a communication unit for communicating with a remote server (41) and/or remote device 20, wherein the control-unit (140) is configured such that the collecting and dispensing unit (120, 220, 320) collects and dispenses a first defined amount of flavoring agent from a first container (10) to the mixer (130, 230, 330), the collecting and dispensing unit (120, 220, 320) collects and dispenses a second defined amount of flavoring agent from a second container (10) to the mixer (130, 230, 330), and the mixer (130, 230, 330) mixes the first and second defined amount of flavoring agents inside of the mixer (130, 230, 330) for producing the new flavoring agent. The invention further relates to a system with such an apparatus, a corresponding process as well as to a container for such an apparatus, system and process.

8 Claims, 15 Drawing Sheets

Figure 1:
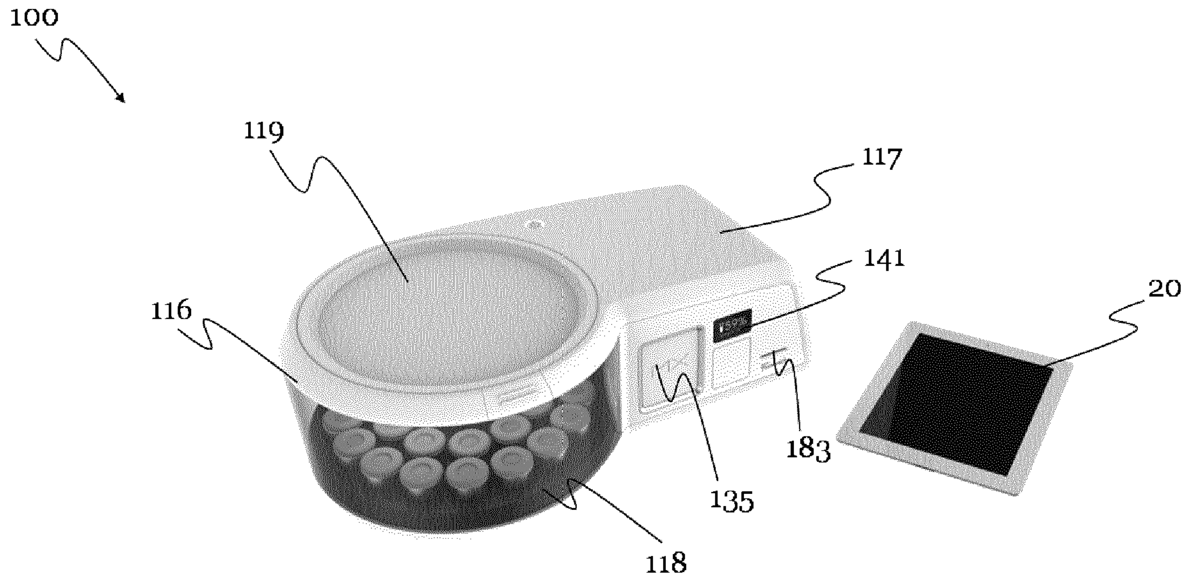

(51) Int. Cl.

| | |
|---|---|
| ***B01F 33/84*** | (2022.01) |
| ***B01F 35/10*** | (2022.01) |
| ***B01F 35/92*** | (2022.01) |
| *B01F 35/90* | (2022.01) |

(56) References Cited

U.S. PATENT DOCUMENTS

| | | | | |
|---|---|---|---|---|
| 7,185,789 | B2 * | 3/2007 | Mink | B01F 33/841<br>222/135 |
| 8,490,829 | B2 * | 7/2013 | Deo | G07F 13/065<br>700/285 |
| 9,051,162 | B2 * | 6/2015 | Peters | G07F 9/001 |
| 10,252,904 | B2 * | 4/2019 | Bertness | B67D 7/78 |
| 10,765,254 | B2 * | 9/2020 | Iotti | A47J 31/402 |
| 10,894,706 | B2 * | 1/2021 | Iotti | B01F 35/88 |
| 10,947,106 | B2 * | 3/2021 | Bertness | B67D 1/0044 |
| 2010/0300181 | A1 * | 12/2010 | Zech | G01G 17/06<br>73/54.01 |
| 2015/0144653 | A1 * | 5/2015 | Kline | G07F 9/001<br>222/23 |
| 2018/0072557 | A1 * | 3/2018 | Bertness | G07F 13/06 |
| 2021/0300804 | A1 * | 9/2021 | Broga | D06F 39/088 |

* cited by examiner

APPARATUS FOR CUSTOMIZED PRODUCTION OF A FLAVORING AGENT MIX

1. FIELD OF THE INVENTION

The present invention relates to an apparatus for customized production of a flavoring agent mix, a system comprising such an apparatus, a corresponding process for customized production of a flavoring agent mix as well as to a container for such an apparatus, system or process.

2. TECHNICAL BACKGROUND

In the prior art, flavoring agents are known. Flavoring agents are typically used in a liquid form for a specific fragrance or flavor, e.g., in perfumes or food including processed and/or preserved food. These flavoring agents are usually produced (mixed) on the side of the supplier on big industrial machines. According to the market and the clients of the suppliers, there is a need for a great variety of different flavoring agents. More specifically, the market requirements with respect to flavoring agents change rapidly. Producers of flavoring agents therefore require to rapidly adapt to the market's or client's needs. However, development and thus production of a new flavoring agent (mix) with the known means requires a substantial amount of time, which does not enable to fully address the above-mentioned needs of the rapidly changing market.

The object of the invention is to overcome the aforementioned drawbacks. In particular, there is a need for an apparatus that allows a user or a client of a flavoring agent supplier to get a specific or customized new flavoring agent (or flavoring agent mix), in particular a flavoring agent tailored to the needs of the user or client, in a rapid and simple way. In particular, such an apparatus should efficiently transfer the user's or client's needs to the specific new flavoring agent. Such an apparatus should, in particular, enable co-creation, reduce time-to-market, reduce iterations in finding the right flavor, combine market and flavor knowledge from flavoring agent experts, include machine learning algorithms, enhance user intimacy, and should enable new data services.

These and other objects, which become apparent upon reading the following description, are solved by the subject-matter of the independent claims. The dependent claims refer to preferred embodiments of the invention.

3. SUMMARY OF THE INVENTION

According to the invention, an apparatus for customized production of a flavoring agent (mix) is provided. The apparatus comprises: a retainer (or storage) for retaining at least two containers, each container comprising a respective flavoring agent, at least one collecting and dispensing unit for collecting and dispensing flavoring agents, a mixer for mixing flavoring agents for obtaining a new (composite/mixed) flavoring agent, a communication unit for communicating with a remote server and/or remote device, and a control unit for controlling at least the collecting and dispensing unit and the mixer.

The control unit is configured such that the collecting and dispensing unit collects and dispenses a first defined amount of flavoring agent from a first container to the mixer, the collecting and dispensing unit collects and dispenses a second defined amount of flavoring agent from a second container to the mixer, and the mixer mixes the first and second defined amount of flavoring agents inside of the mixer for producing the new flavoring agent.

According to the invention, "flavoring agent" is preferably to be understood as a liquid sample, which comprises one or more flavors in a form for investigating the flavor and/or for subsequently using the flavor in a product such as in food or a fragrance.

According to the invention, "customized production" is preferably to be understood such that a user of the apparatus can input a desired composition of a new flavoring agent into the apparatus, wherein the production of the new flavoring agent by the apparatus is subsequently started immediately.

In other words, the present invention provides an apparatus or personal device, which is in particular portable and can, thus, be placed at any location, in particular in the client's laboratory or development center independent from large scale laboratories or at the customer's location for demo purposes. The apparatus therefore facilitates a customized production of a preferably liquid flavoring agent. Therefore, the apparatus enables a client to create an own, i.e. customized flavoring agent or a flavoring agent having a customized formula or composition, immediately, i.e. without waiting for the new flavoring agent by way of instructing a different company or a supplier. The apparatus therefore provides a simple and efficient tool for a user of the apparatus to produce a new flavoring agent, e.g., by modifying or adjusting the amounts of different flavoring agents in the new (composite) flavoring agent, therefore accelerating iterations steps for obtaining the new flavoring agent. The apparatus therefore provides a means for efficiently tailoring a new flavoring agent to market requirements. And since the user of the apparatus can individually produce a flavoring agent, also the user's intimacy is improved.

By way of the communication unit, in particular computing power can be outsourced to the remote server and/or the remote device, making the apparatus even more compact, efficient and flexible. A supplier receiving the data on the side of the remote server can thus also better understand its clients, its customer knowhow and the market trends. Therefore, new and more efficient services for the customers/users can be created. Communication with the remote server, e.g. a "cloud" in the internet, may be provided via internet technology, e.g. via Wi-Fi/DSL and/or wirelessly such as via a mobile communication network. By way of the remote device the user may easily control and/or monitor the apparatus, e.g. wirelessly. In particular, the user of the apparatus may couple already existing remote devices with the apparatus via the communication unit. Communication with the remote device, e.g. a user interface such as a portable device or a display unit, may be provided via wireless communication, e.g. Wi-Fi, Bluetooth or other short distance communication technology.

The apparatus may comprise at least two collecting and dispensing units. That is, the apparatus may comprise a first collecting and dispensing unit for collecting the flavoring agent from the first container and a second collecting and dispensing unit for collecting the flavoring agent from the second container. In general, the number of collecting and dispensing units may correspond to the number of containers retained by the retainer.

The control-unit may be configured such that the first collecting and dispensing unit and the second collecting and dispensing unit simultaneously collect and dispense the first defined amount of flavoring agent and the second defined amount of flavoring agent from the first container and the second container to the mixer. Thus, the first and second defined amount of flavoring agent can rapidly flow to the mixer, thereby effecting a quick way for obtaining the new flavoring agent front the at least two defined amounts of flavoring agents.

Preferably, the first collecting and dispensing unit comprises a first pump, and the second collecting and dispensing unit comprises a second pump. Thus, pumping of the first collecting and dispensing unit for collecting and dispensing the first defined amount and pumping of the second collecting and dispensing unit for collecting and dispensing the second defined amount are independent from one another.

The retainer may comprise the first pump and the second pump, wherein the first pump and the second pump are preferably integrated in the retainer or in the container retained by the retainer. Thus, the pumps can be arranged in close vicinity or next to the respective containers, e.g. directly connected to the respective containers. In another example, the pumps may be integrated with the respective containers; as such, dispensing and collecting by means of the collecting and dispensing units is possible, when the containers and thus the pumps are inserted in the apparatus or retained in the retainer. The first pump and/or the second pump may be a peristaltic pump, which is particularly advantageous for saving space in the apparatus.

In an implementation of the apparatus, the apparatus comprises a single pump or only two pumps for the at least first and second collecting and dispensing unit, preferably for more than two collecting and dispensing units.

The apparatus may comprise a valve, which can be moved (at least) between a first position and a second position, wherein in the first position only the first collecting and dispensing unit is arranged to collect and dispense the first defined amount of flavoring agent from the first container to the mixer, and wherein in the second position only the second collecting and dispensing unit is arranged to collect and dispense the second defined amount of flavoring agent from the second container to the mixer. The valve prevents that parts of the first defined amount flows back into the second container and that parts of the second defined amount flows back into the first container. Thereby, in particular cross-contamination between the first and the second container is effectively reduced.

The collecting and dispensing unit may be a manipulator.

Preferably, the apparatus further comprises a cooling unit for cooling the containers. Therefore, the flavoring agents inside of the containers remain stable over a long period of time.

The apparatus may further comprise an output for outputting the new flavoring agent. In this way, a user of the apparatus can simply remove the new flavoring agent from the apparatus. Preferably, the new flavoring agent is filled in a new container (i.e. an "output container"), so that the output outputs the new flavoring agent by way of the new container. A user of the apparatus can therefore immediately and securely store the new flavoring agent, namely by way of the output and the new container. For example, the collecting and dispensing unit, in particular the manipulator, is adapted for filling the new flavoring agent in the new container.

The output may comprise a moving mechanism, e.g. a moving rack, that is configured to receive the new container and a next (new) container and to move the new container to make space for the next container to be filled with the (next) new flavoring agent. This will allow automated runs of the apparatus for more than one sample without user intervention. The moving mechanism of the output, in particular the (output) moving rack, may be configured to move the output container in a circular fashion to make place for the next container. Thus, the moving mechanism is, for example, in a circular form. Alternatively, the moving mechanism is configured to move the new container(s) in a substantially straight line away from the output (vertically or horizontally) in order to make space for the next container. Thus, the moving mechanism is, for example, in a rectangular form.

The output may comprise a balance (or scale) for weighing the new flavoring agent. The balance may be a microbalance. The balance may be an electronic balance. The balance or the control unit of the balance may have an accuracy of 0.1, preferred 0.01, most preferred 0.001 g. The weight value may be recorded in an electronic form. For example, this electronic value may then be forwarded to the (central) control unit. The weight value is advantageously needed to give accuracy of the dosing operation of the collecting and dispensing unit (e.g. the manipulator) in weight. That is, the control unit of the apparatus may control the dosing operation of the collecting and dispensing unit based on the recorded weight value. As such, accurate weight ratios of the individual flavoring agent components of the formula for the new flavoring agent can be achieved. This is particularly advantageous compared with a configuration, which uses only volumetric measures for the dosing operation. Namely, because of large density variations between flavoring agent components and because of the effect of temperature on density, the accuracy of the volumetric dosing may be insufficient.

Preferably, each of the containers comprises a lid for sealingly closing the container. Therefore, degradation of the flavoring agents inside of the containers is prevented. Also cross-contamination between the containers is thus reduced to a maximum value of 1% or below. Moreover, the lid may be designed such that the container is accessible for the collecting and dispensing unit, e.g. for the manipulator, in particular for a pipette being held by the manipulator. The lid may be a re-closable lid. For example, the lid may be designed such that by penetrating the lid by way of the collecting and dispensing unit or the manipulator or the pipette the lid is opened by way of this penetration movement. When the collecting and dispensing unit or the manipulator, in particular the pipette, is removed from the container and the lid, the lid may then close automatically, e.g., by way of the lid elastically returning to its original form for sealingly closing the container. In this way, the lid provides an easy way for both accessing and sealingly closing the container.

Preferably, the manipulator comprises at least one, at least two, more preferably three degrees of freedom for reaching and accessing a container or each of the containers. Therefore, a plurality of differently positioned containers inside of the apparatus are easily reachable for the manipulator.

The degrees of freedom of the manipulator may comprise translational degrees of freedom. In this way, in particular a substantially elongated apparatus may be provided. The apparatus may thus be designed in a compact manner. Additionally or alternatively, the degrees of freedom comprise rotational degrees of freedom. In this way, the containers in the retainer may be provided around the manipulator. Therefore, a compact apparatus is provided.

Preferably, the retainer is movably, preferably rotatably provided with respect to the manipulator, and wherein the control unit is configured to control the manipulator and the retainer such that by moving of the retainer and/or the manipulator the manipulator can reach and access a container or each of the containers. Therefore, a degree of freedom of the manipulator can be omitted. The manipulator and, thus, the apparatus can therefore be made more compact.

Preferably, the retainer retains the containers in a circular or grid manner. As such, the containers are placed in a manner easily reachable for the collecting and dispensing unit, in particular for the manipulator.

The retainer may comprise a washing container containing a cleaning fluid and/or a waste container for residual flavoring agents removed from the collecting and dispensing unit, wherein the retainer retains the washing container and/or the waste container. The washing container and/or waste container is/are preferably removably retained in the retainer. Thus, the washing container and/or waste container do not require a dedicated space in the apparatus, thereby making the apparatus more compact. Moreover, since the retainer already facilitates easy access to the containers containing the flavoring agents, the washing container and/or waste container are easily accessible without further expenses. Preferably, the washing container and/or the waste container are provided next to the containers containing the flavoring agents.

The control-unit may be configured such that the collecting and dispensing unit collects and dispenses a defined amount of the cleaning fluid from the washing container to the mixer for cleaning the mixer. Thus, the mixer is effectively cleaned, and the cleaning fluid flowing through the collecting and dispensing unit cleans the collecting and dispensing unit at the same time.

The apparatus may further comprise coding means for obtaining information about a particular flavoring agent held within a container in the retainer of the apparatus. The coding means may comprise a sensor such as a QR-, barcode—or an RFID reader. The coding means are preferably designed to retrieve information about the content of a particular container from identification means such as a barcode or RFID tag provided on the container to be inserted into the retainer of the apparatus. The information may be retrieved directly from the container or may be retrieved via associating the obtained information from the container with information retrieved via the remote server by means of the communication unit. The coding means of the apparatus is preferably connected to the control unit.

The control unit of the device is preferably further designed for associating a particular container to a particular position within the retainer of the apparatus. Thereby, the control means may be designed for associating information obtained about the container, e.g. by dedicated coding means or by a user input, to a particular position within the retainer. The position within the retainer for a particular container to be inserted into the apparatus may be chosen and/or set automatically by the control unit or may be inputted by the user. Accordingly, the control unit is preferably designed to control and/or track information about the containers and their contents held within the retainer of the apparatus.

The control-unit is preferably configured to switch the apparatus in a cleaning mode, in which a cleaning fluid is flowing at least through the collecting and dispensing unit for removing residual flavoring agents at least from the collecting and dispensing unit. The cleaning fluid may be a liquid or a fluid. Preferably, the fluid is air or a solvent that is pushed through the apparatus or collecting and dispensing unit. The cleaning fluid may flow through the collecting and dispensing unit in a cycling fashion (cleaning cycles). Thus, operating the apparatus in the cleaning mode effectively avoids cross contamination from one sample to another.

The control-unit is preferably configured to switch the apparatus in an automated mode, in which several new flavoring agents are automatically produced. The automatic production of the new flavoring agents may be executed based on parameters, which were inputted by a user of the apparatus.

Preferably, the apparatus further comprises a pipette station comprising pipettes, e.g. provided in a pipette box. The control unit is then configured such that the collecting and dispensing unit, in particular the manipulator, takes/collects a first pipette from the pipette station and collects the first defined amount of flavoring agent from the first container by means of the first pipette, the collecting and dispensing unit dispenses the first defined amount of flavoring agent from the first pipette into the mixer, and (subsequently) the collecting and dispensing unit disposes of or discards the first (used) pipette. The control unit is further configured such that the collecting and dispensing unit takes a second pipette from the pipette station and collects the second defined amount of flavoring agent from the second container by means of the second pipette, the collecting and dispensing unit dispenses the second defined amount of flavoring agent from the second pipette into the mixer by means of the second pipette, the mixer mixes the first and second defined amount of flavoring agents inside of the mixer for obtaining the new flavoring agent, and the collecting and dispensing unit disposes of the second pipette. Therefore, since the apparatus uses different pipettes for the first and second defined amount of flavoring agent, cross-contamination is prevented or at least reduced to a maximum value of 1% or below, since a pipette is only used once. Therefore, flavoring agents inside of the containers are not contaminated by a flavoring agent of another container. As such, the user of the apparatus obtains a new flavoring agent having the exact required amounts as defined.

Preferably, the apparatus further comprises a pipette disposal station, and wherein the control unit is configured such that the collecting and dispensing unit disposes of the first pipette and the second pipette into the pipette disposal station. Therefore, an easy way for the disposal of the used pipettes out of the apparatus, e.g. by way of the pipette disposal station in the form of a drawer, is provided.

Preferably, the communication unit communicates at least the following data with the remote server and/or remote device: type or composition of the first and second defined amount of flavoring agent, composition of the new flavoring agent, processing parameters such as temperature of the room (in which the apparatus is provided) and/or of the flavoring agents, user data, production date, production time and/or identification code of the new flavoring agent, amount produced of the new flavoring agent, data linked to sensory profiles of the new flavoring agent and/or of the flavoring agents of the containers, and/or filling level of the containers. The apparatus may comprise corresponding sensors being connected to the communication unit to obtain this data. The data generated by using the apparatus may be continuously tracked or obtained. Based on the data, the apparatus can be easily maintained and/or findings with respect to the new flavoring agent can be transmitted to the communication unit, the user of the apparatus, respectively. In this way, also new containers with new flavoring agents can be recommended and sent to the user to be used in the apparatus. Therefore, iterations steps for obtaining a specific new flavoring agent are accelerated. Moreover, surveys or the like for the user may be received by the communication unit for better adapting the apparatus and/or the flavoring agents to the user.

Preferably, the apparatus comprises a (single) housing for housing at least the retainer, the pipette station, the pipette disposal station, the cooling unit, the collecting and dispensing unit and/or the mixer. In this way, the respective components of the apparatus can be housed in a compact manner. Therefore, in particular the portability of the apparatus is improved.

The housing may have a substantially cylindrical, box-shaped and/or cubicle form. In these forms of the housing the respective components can be efficiently arranged. In particular, the housing may have additionally or alternatively box-shaped and/or cubicle housing parts. By combining these housing parts, the respective components can be efficiently arranged in the housing.

The housing may have a substantially cylindrical housing part and a substantially box-shaped or cubicle housing part, wherein the substantially cylindrical housing part houses at least the retainer and preferably the pipette station, and wherein the substantially box-shaped or cubicle housing part houses at least the mixer and preferably the cooling unit. With such an arrangement of the housing parts, the respective components are efficiently arranged in the apparatus and, thus, a compact apparatus is provided.

For easy transportation of the apparatus, the apparatus may be configured to be transported by a transport mechanism for transporting the apparatus, or the apparatus may comprise a transport mechanism for transporting the apparatus.

The transport mechanism may be a container, e.g. a shipping container having a standardized size such as an intermodal container.

The transport mechanism may be a case, e.g. a case having wheels, in particular a suitcase.

The apparatus may be integrated with the transport mechanism.

The invention further relates to a system comprising an apparatus as described above. The apparatus is configured to send and receive data by means of the communication unit of the apparatus. The system further comprises a remote server and/or a remote device configured to receive data from the apparatus and to send data to the apparatus. The remote server and/or remote device is configured to send data to the apparatus, the data being based on data sent by the apparatus and received by the remote server and/or the remote device. Therefore, in particular computing power can be outsourced to the remote server and/or remote device, making the apparatus even more compact, efficient and flexible. In the system, the apparatus can thus be easily controlled by the user using the remote device. By way of the remote server, the apparatus may be maintained and/or findings with respect to the new flavoring agents can be transmitted to the user of the apparatus in an easy manner. In particular, by means of the system the iterations steps for obtaining a new flavoring agent are accelerated. Furthermore, new services with respect to flavoring agents, e.g. data collection, recommendations and surveys, are efficiently enabled.

The data sent by the apparatus may at least comprises the following data: type or composition of the first and second defined amount of flavoring agent, composition of the new flavoring agent, processing parameters such as temperature of the room (in which the apparatus is provided) and/or temperature of the flavoring agents, user data, production date, production time and/or identification code of the new flavoring agent, amount produced of the new flavoring agent, data linked to sensory profiles of the new flavoring agent and/or of the flavoring agents of the containers, and/or filling level of the containers. Based on this data, the system can easily maintain the apparatus and/or findings with respect to the new flavoring agents can be transmitted to the apparatus, the user of the apparatus, respectively. In this way, also new containers with new flavoring agents can be recommended and sent to be used in the apparatus. Therefore, iterations steps for obtaining a specific new flavoring agent are accelerated.

The data being sent by the remote server and/or remote device and received by the apparatus may at least comprises the following data: type and/or composition of a recommended flavoring agent, processing indicators and/or processing parameters, and/or maintenance data. Therefore, a system for accelerating iterations steps for obtaining a new flavoring agent is provided. Also, the life time of the apparatus is extended due to the improved maintenance of the apparatus.

In the system, the apparatus may comprise a display unit, e.g. the remote device, being configured to communicate with the remote server, in particular with a display unit on a side of the remote server, e.g. by way of a video chat. In this way, a user may communicate with an expert for maintenance reasons and/or the expert may advice the user with respect to flavoring agents.

The invention further relates to a process for customized production of a flavoring agent with an apparatus or system as described above. The process comprises the following steps: collecting and dispensing a first defined amount of flavoring agent from one of the containers to the mixer by means of the collecting and dispensing unit (e.g., the manipulator), collecting and dispensing a second defined amount of flavoring agent from one of the containers to the mixer by means of the collecting and dispensing unit, mixing the first and second defined amount of flavoring agents inside of the mixer for obtaining the new flavoring agent, and communicating, by means of the communication unit, with a remote server and/or remote device, e.g. the above described data.

The invention further relates to a container (cartridge) for an apparatus, a system or a process as described above. The container (or container body) comprises a lid for sealingly closing the container. Therefore, a container for collecting/storing a flavoring to be used in the apparatus, the system and/or the process is provided, which prevents degradation of the flavoring agent contained in the container.

Preferably, the lid is designed such that the container is accessible for the collecting and dispensing unit, in particular for the manipulator or for a pipette being held by the manipulator. The access can be with a pipette being held by the collecting and dispensing unit or by the manipulator, with a tube that is connected to the collecting and dispensing unit or the manipulator, or the nozzle of a die head. In this way, flavoring agents inside of the container may be easily extracted multiple times without subsequent degradation of the flavoring agent. Moreover, the lid may be designed such that the container is accessible for the collecting and dispensing unit or the manipulator, in particular for a pipette being held by the manipulator. The lid may be a re-closable lid. For example, the lid may be designed such that by penetrating the lid by way of the collecting and dispensing unit or the manipulator or the pipette the lid is opened by way of this penetration movement. When the collecting and dispensing unit or the manipulator, in particular the pipette, is removed from the container and the lid, the lid may then close automatically, e.g., by way of the lid elastically returning to its original form for sealingly closing the container. In this way, the lid provides an easy way for both accessing and sealingly closing the container.

The lid preferably comprises a seal, which is designed such that the collecting and dispensing unit or the manipulator, in particular the pipette, can penetrate the seal for accessing the container, and such that the seal automatically or elastically closes or returns to its original form, when the collecting and dispensing unit or the manipulator, in particular the pipette, is released from the seal. In other words, the seal may form an elastic part of the lid for automatically closing the seal, when the collecting and dispensing unit or the manipulator is released from penetrating the lid. Therefore, the lid immediately closes by means of the seal as soon as the collecting and dispensing unit or the manipulator is released from the lid. Therefore, the flavoring agent inside of the container is prevented of subsequent degradation and/or cross contamination.

Preferably, the container is made of aluminum. Since aluminum is a relatively light material, light containers are provided. By way of the aluminum, also safe storage of the flavoring agents inside of the container is provided. The container may be also made of any other metal. Additionally or alternatively, the material of the container may be a synthetic material, preferably LDPE, HDPE, PP, PMP, TFE and/or glass.

The container, preferably the container bod, in particular the inner surface and/or outer surface of the container body, comprises a surface treatment such as a lamination. The surface treatment particularly effects that the container does not degrade, e.g. due interaction with the flavoring agent. The surface treatment also facilitates that the flavoring agent does not quickly lose quality over time.

The container, in particular the container body, may have a substantially stiff structure.

The container, in particular the container body, may have a substantially flexible structure. Preferably, the container, in particular the container body, is designed as a pouch.

The container comprises a stabilizing structure, e.g. a box, which surrounds the container, in particular the container body, for stabilizing the flexible structure. The stabilizing structure effects, in particular, that the container can be easily handled, e.g. for being inserted in the retainer, without negatively affecting the flexible structure of the container.

The container may comprise an integrated pump for pumping a liquid, which is provided inside of the container, to an outside of the container, in particular for mixing a new flavoring agent by the apparatus. As such, the container is independent from the apparatus for pumping of the flavoring agent into the apparatus and into the mixer of the apparatus, respectively. The pump may be a peristaltic pump.

4. DESCRIPTION OF A PREFERRED EMBODIMENT

Figure 2:
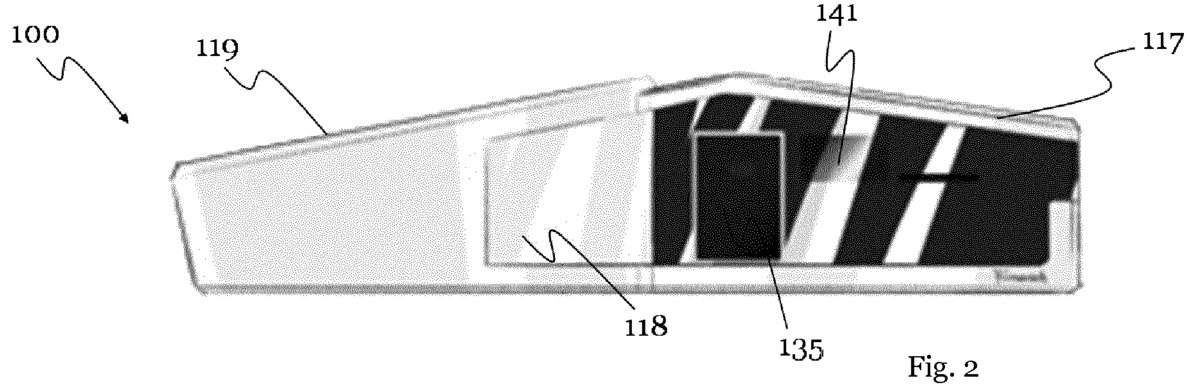
Figure 3:
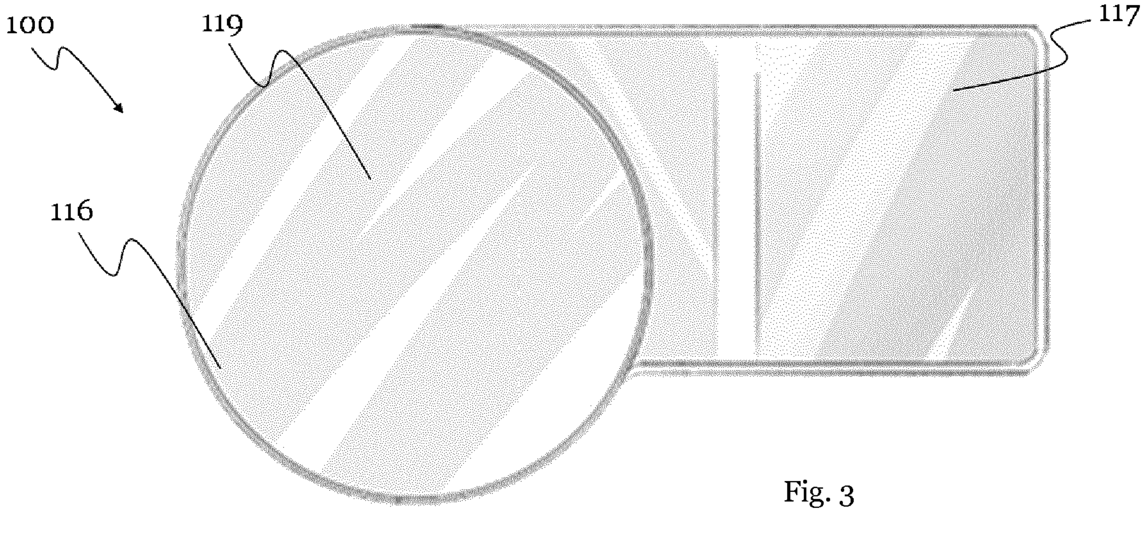
Figure 4:
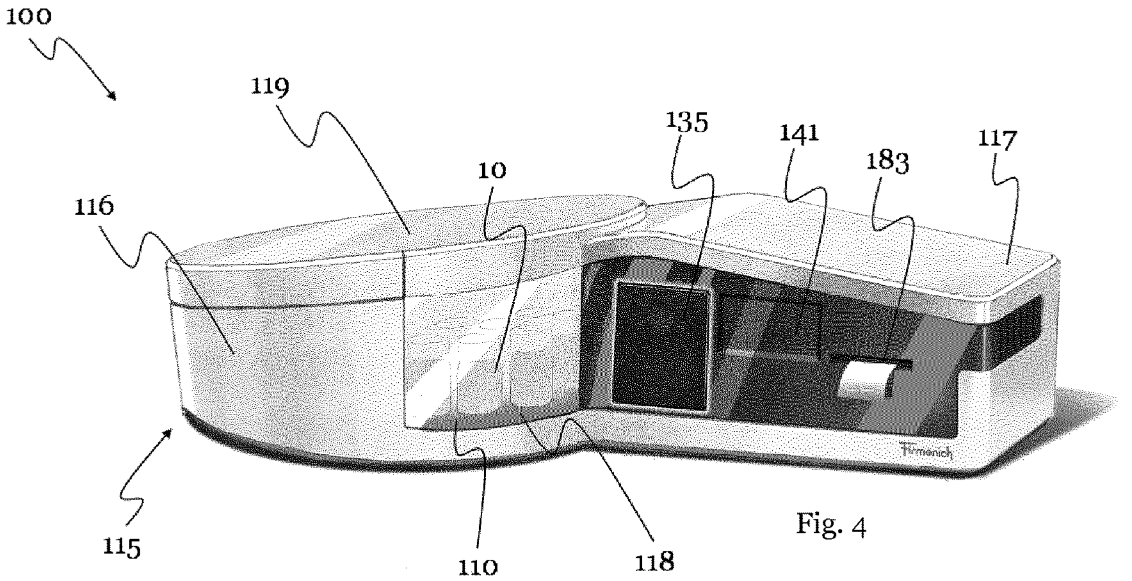
Figure 5:
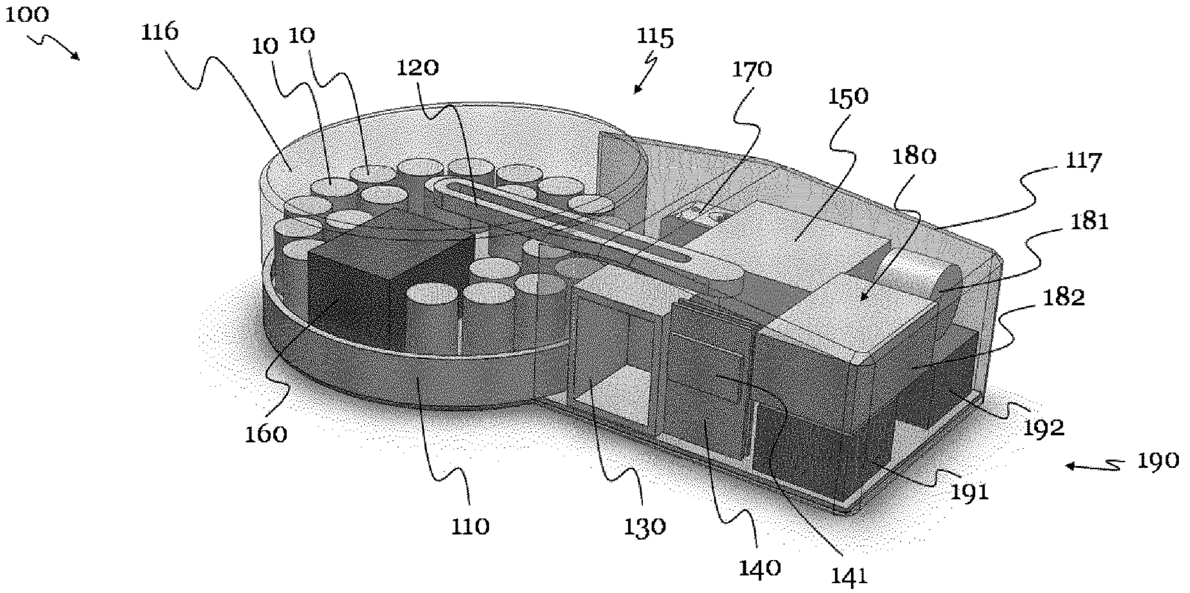
Figure 6A:
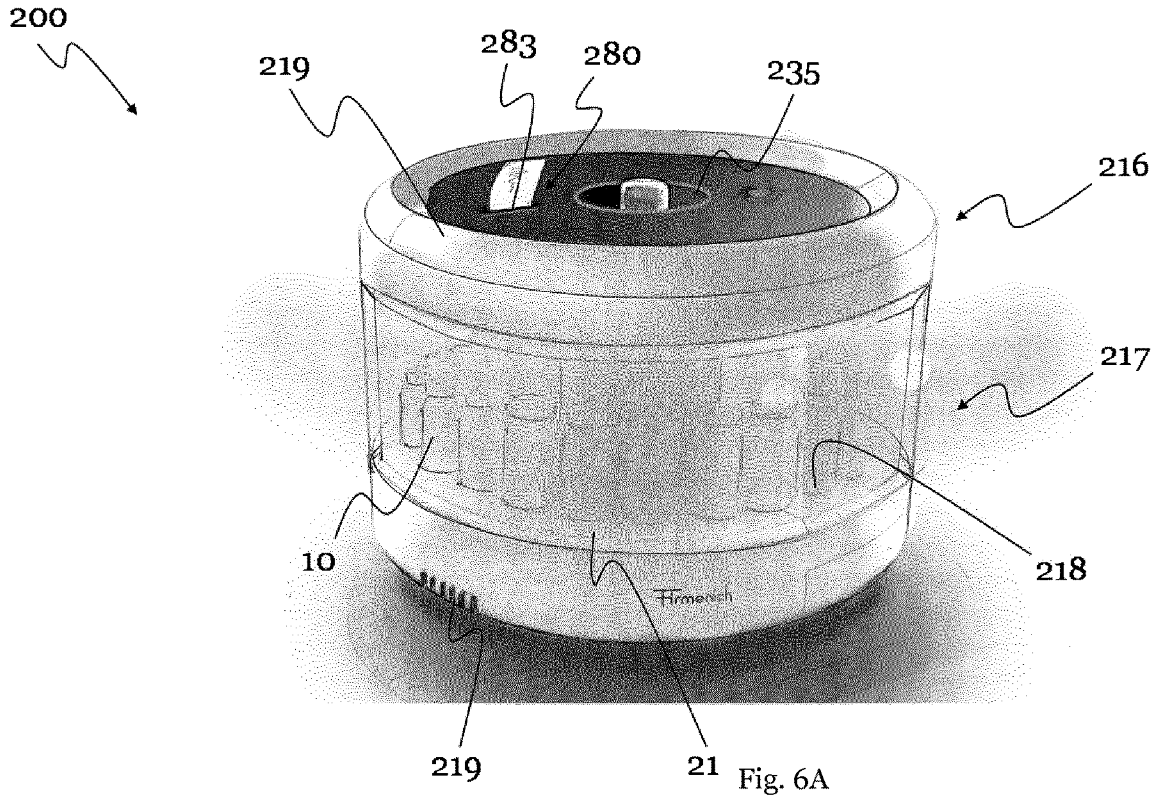
Figure 6B:
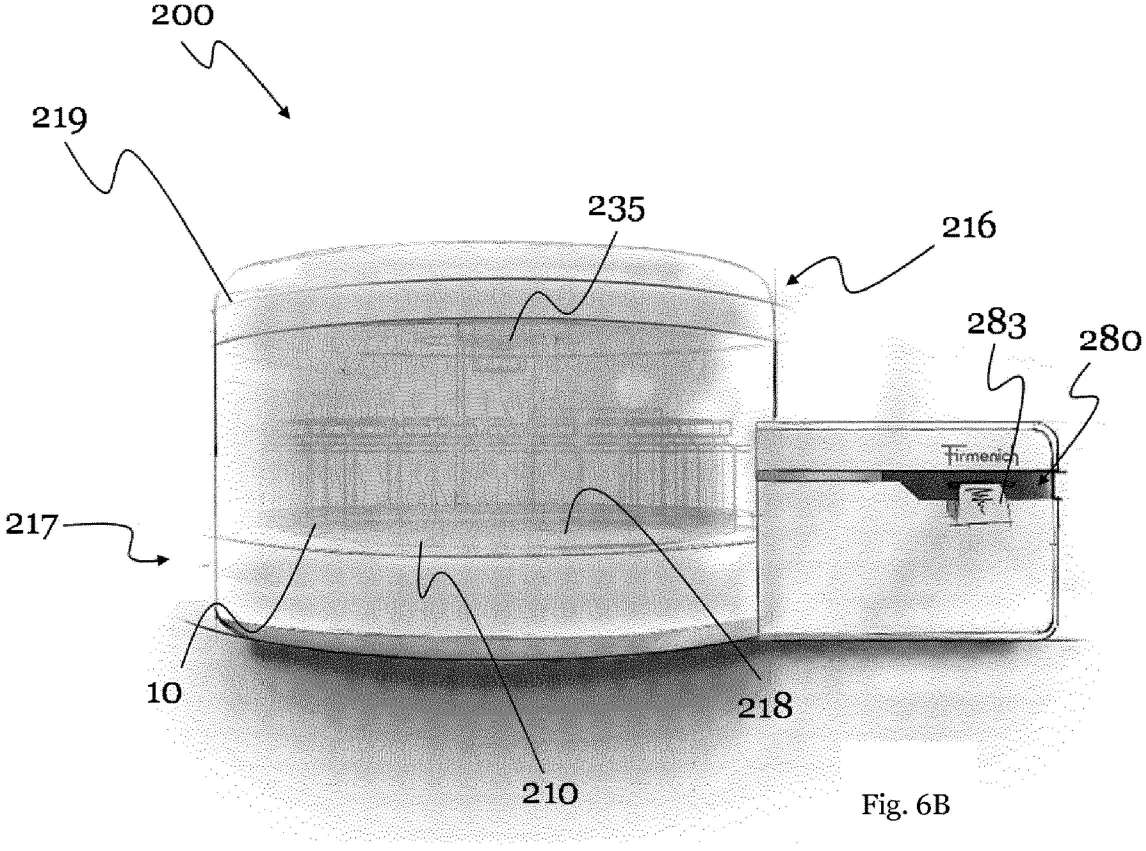
Figure 7:
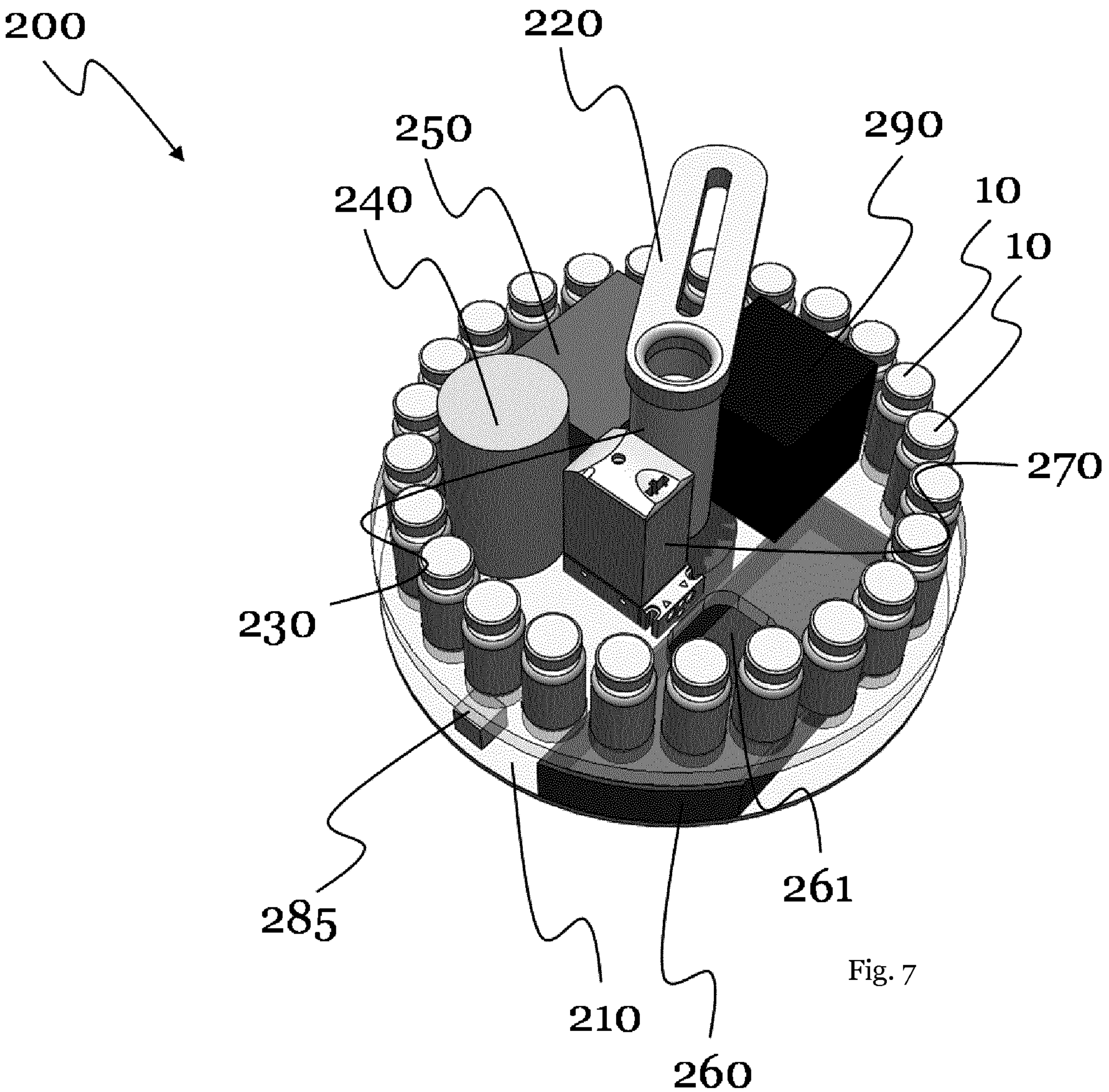
Figure 8:
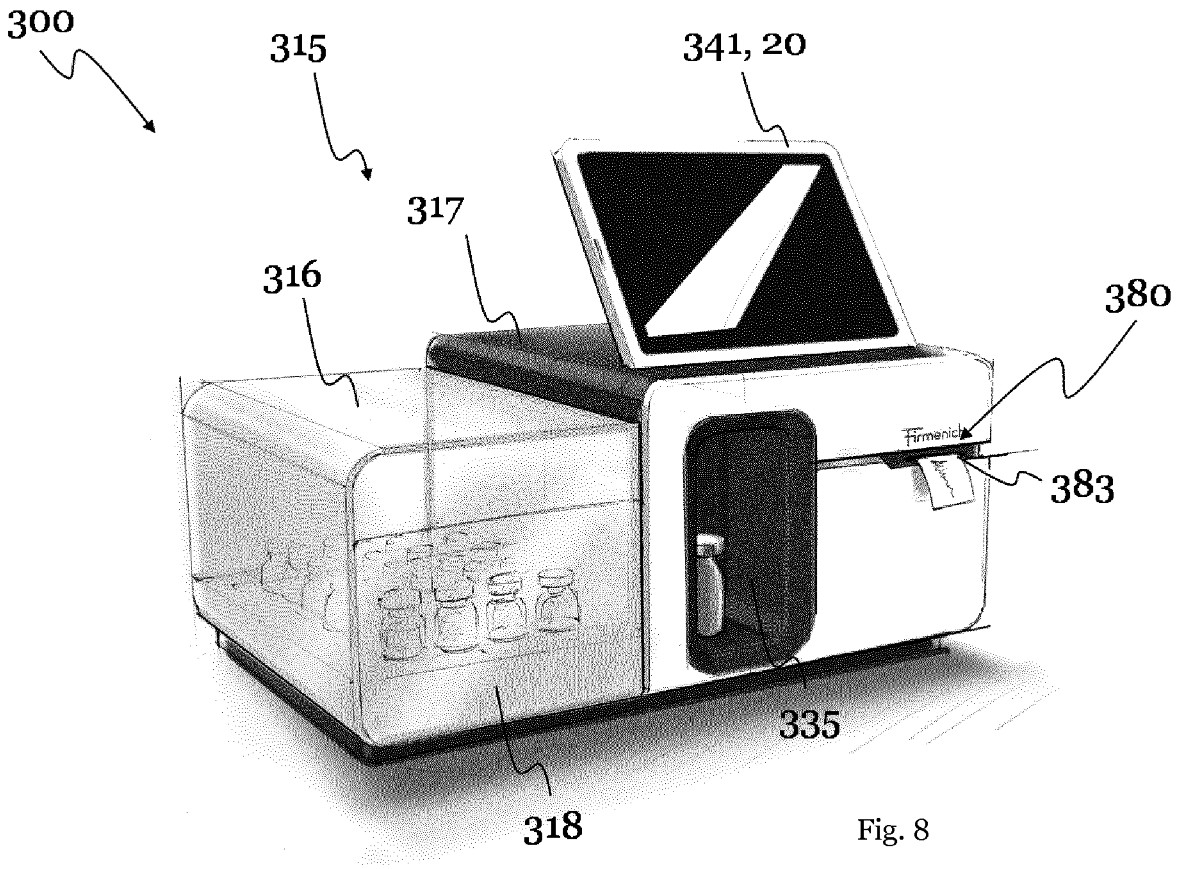
Figure 9:
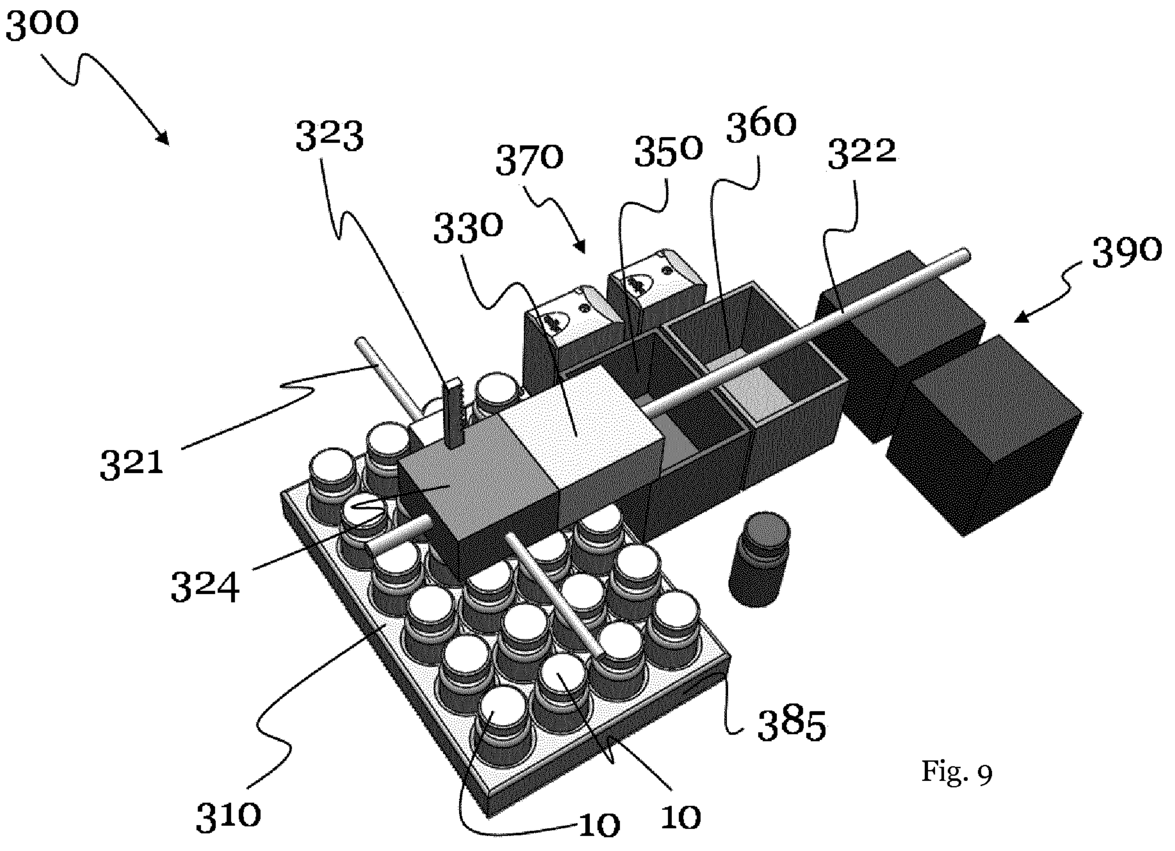
Figure 10:
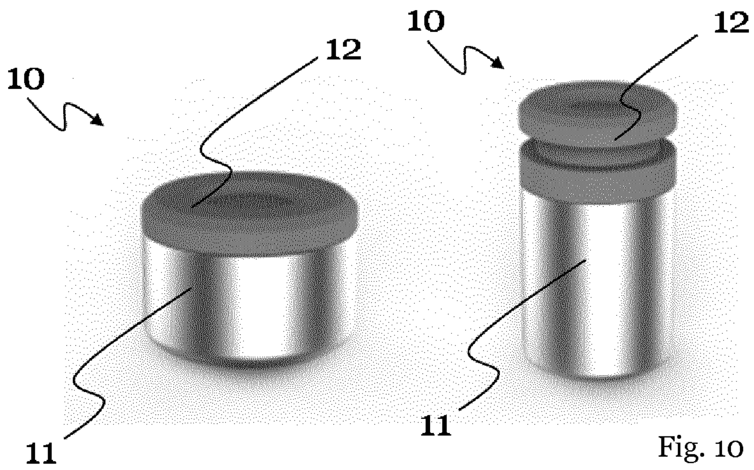
Figure 11:
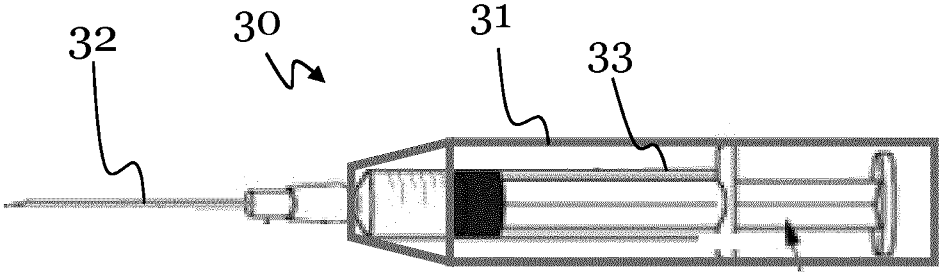
Figure 12:
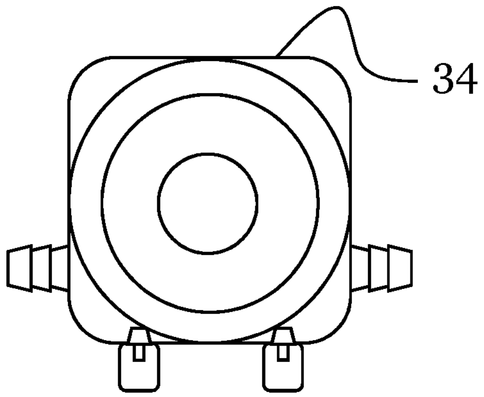
Figure 13:
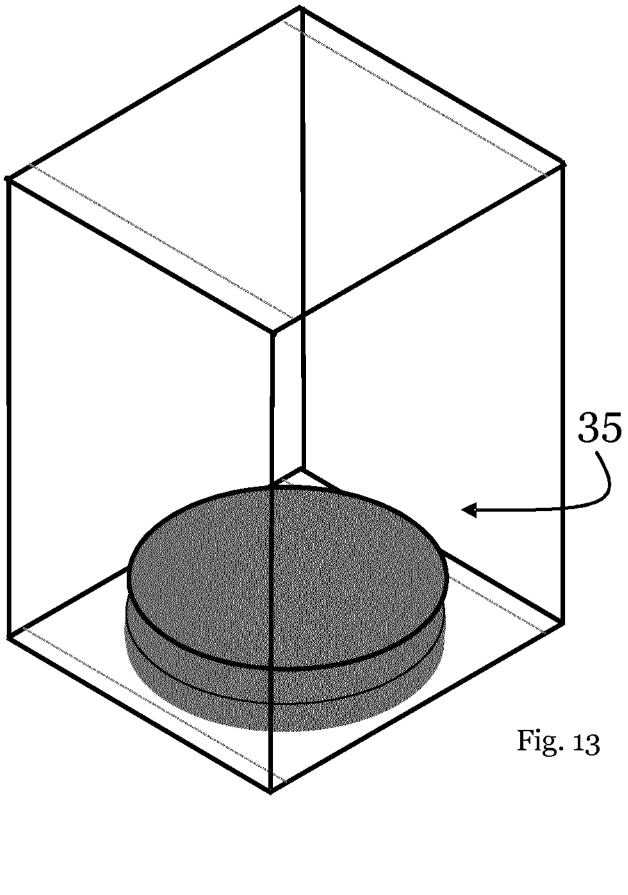
Figure 14:
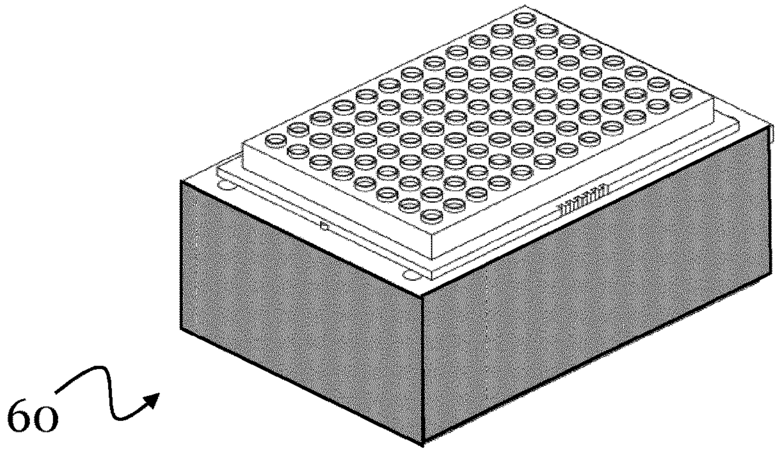
Figure 15:
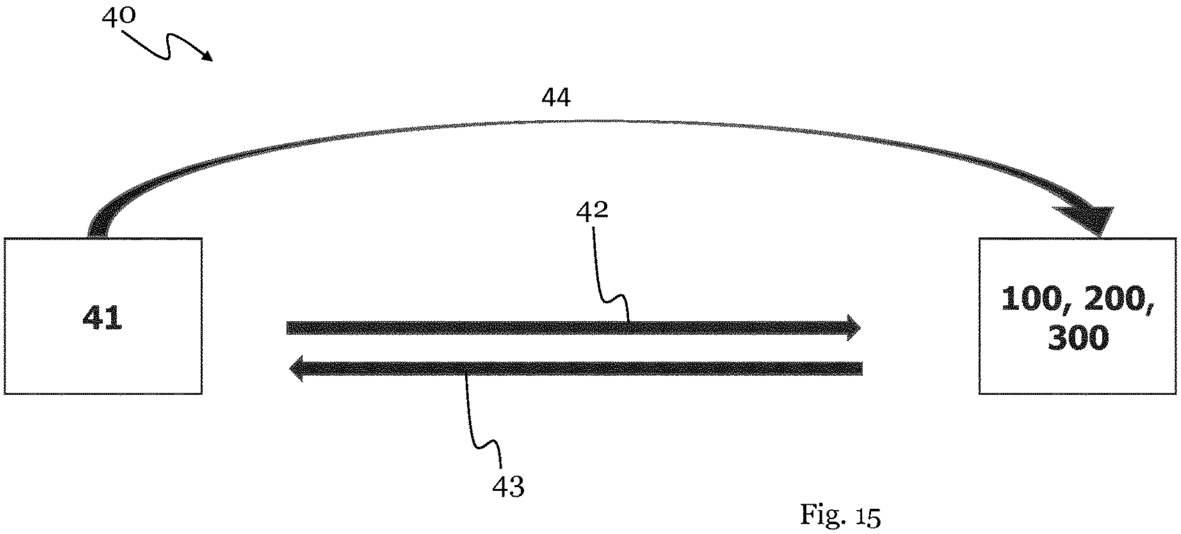
Figure 16A:
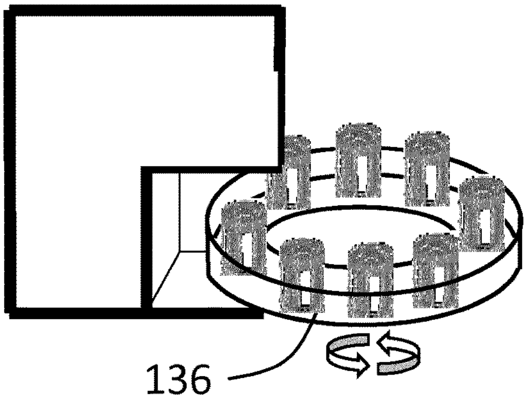
Figure 16B:
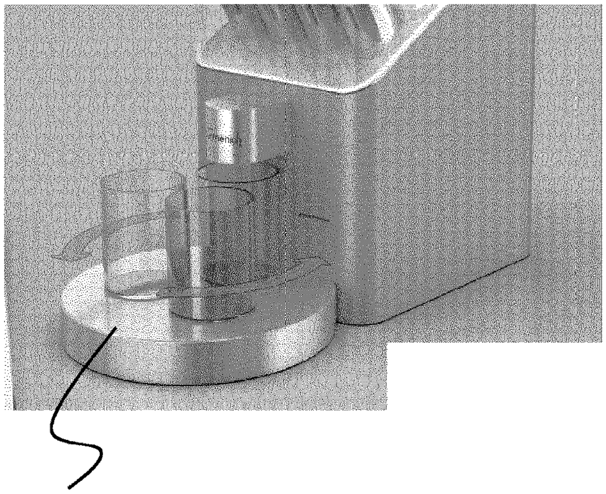
Figure 17:
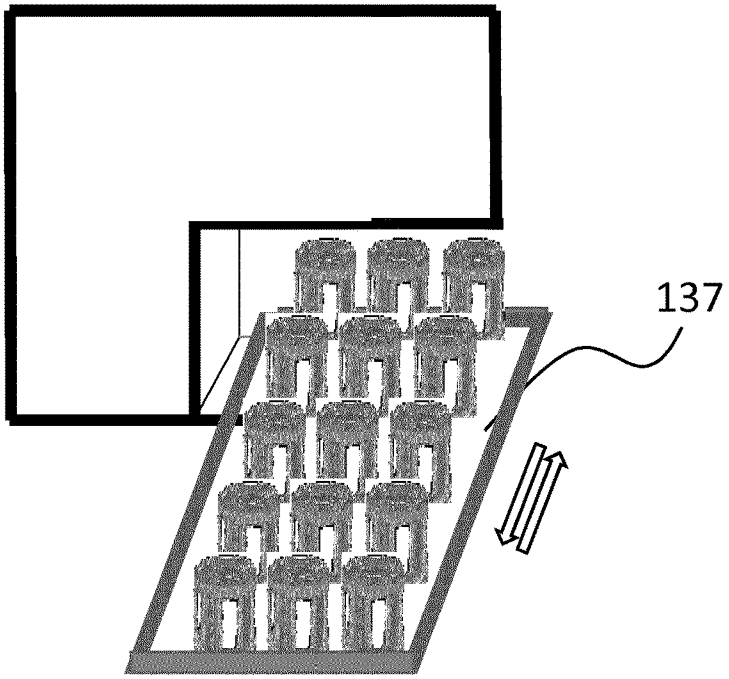
Figure 18A:
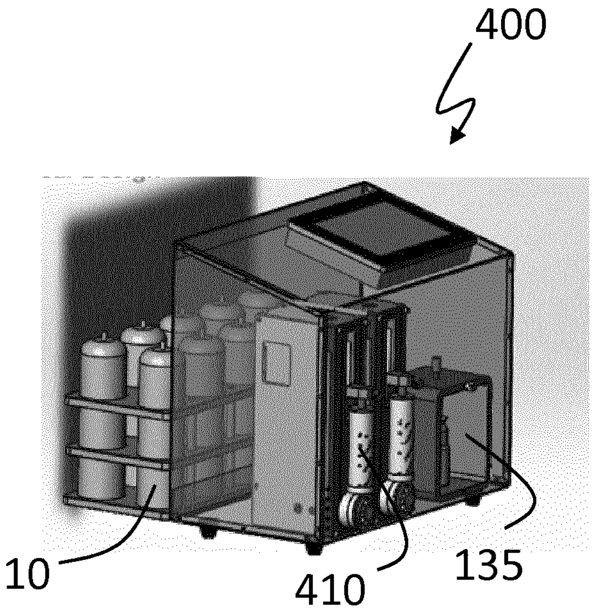
Figure 18B:
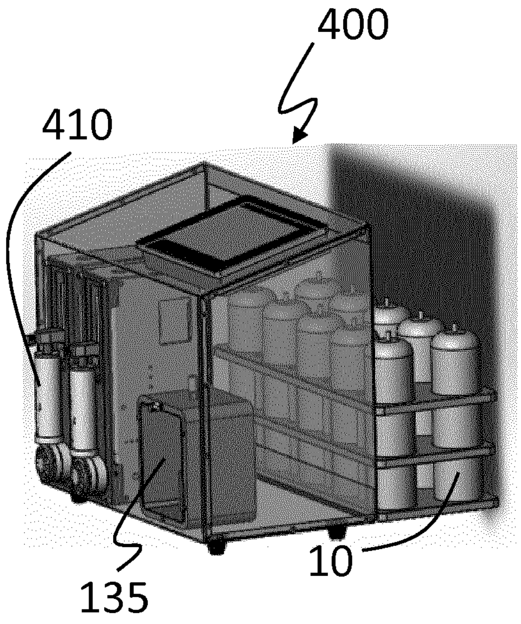
Figure 18C:
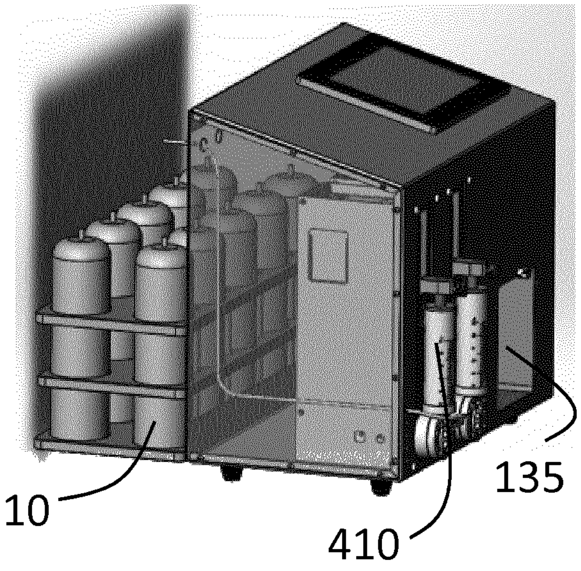
Figure 18D:
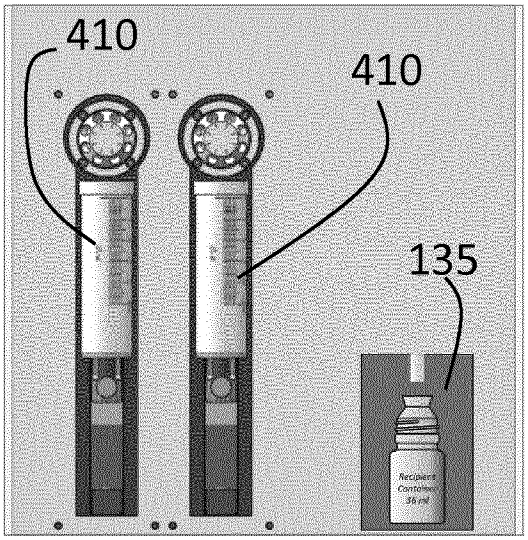
Figure 19A:
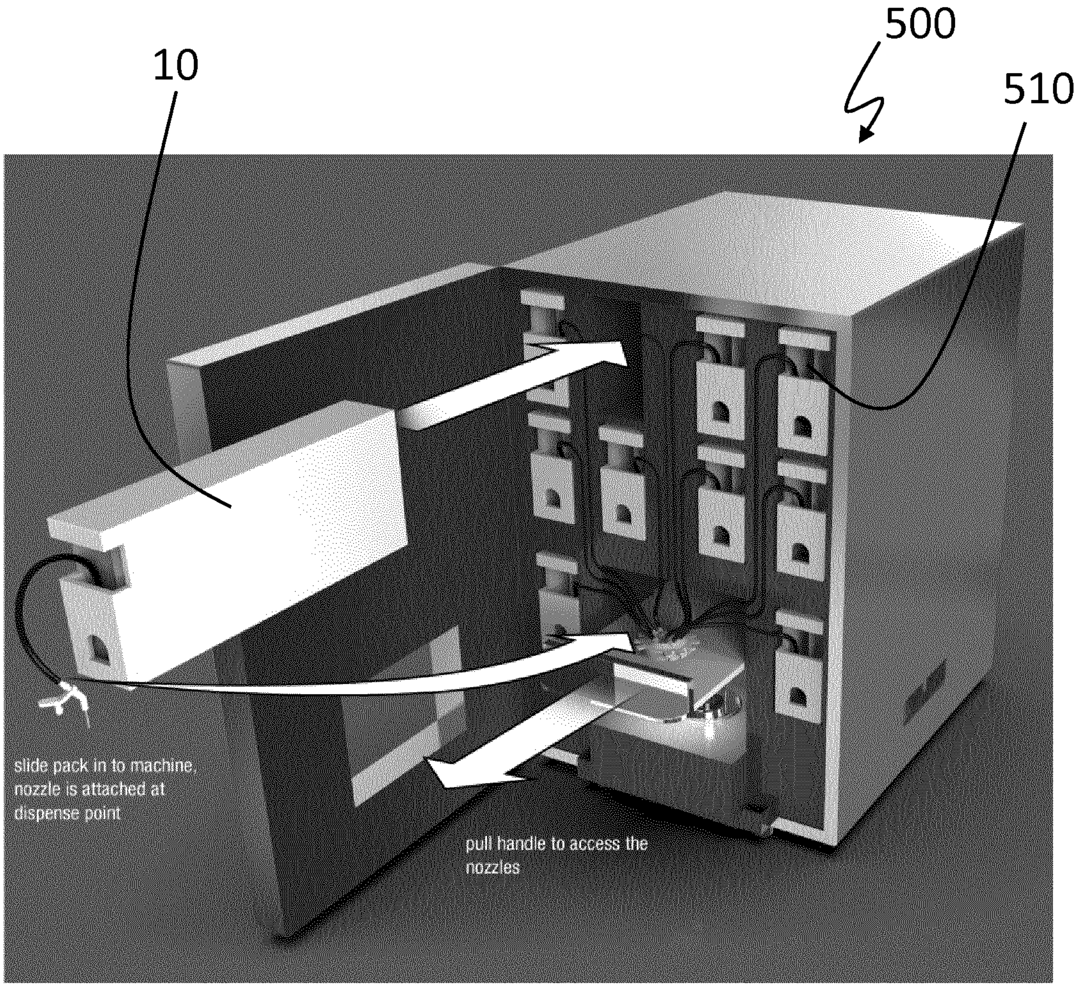
Figure 19B:
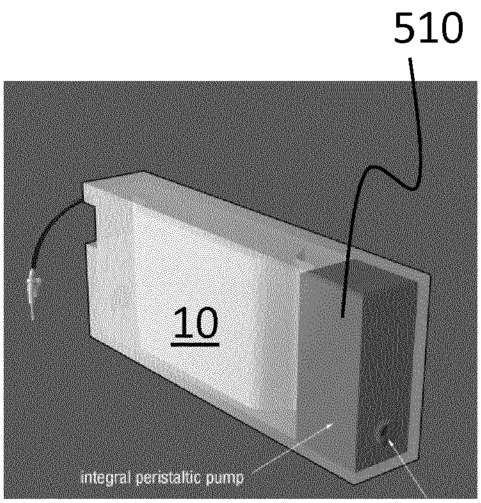
Figure 19C:
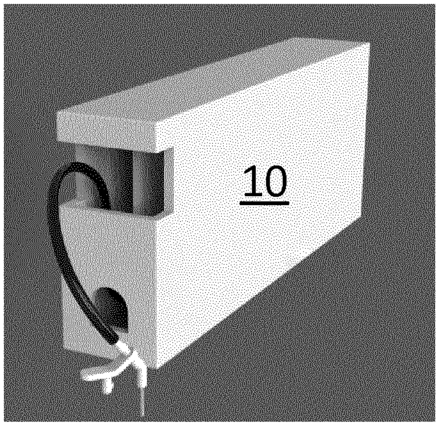
Figures 19D, 19E:
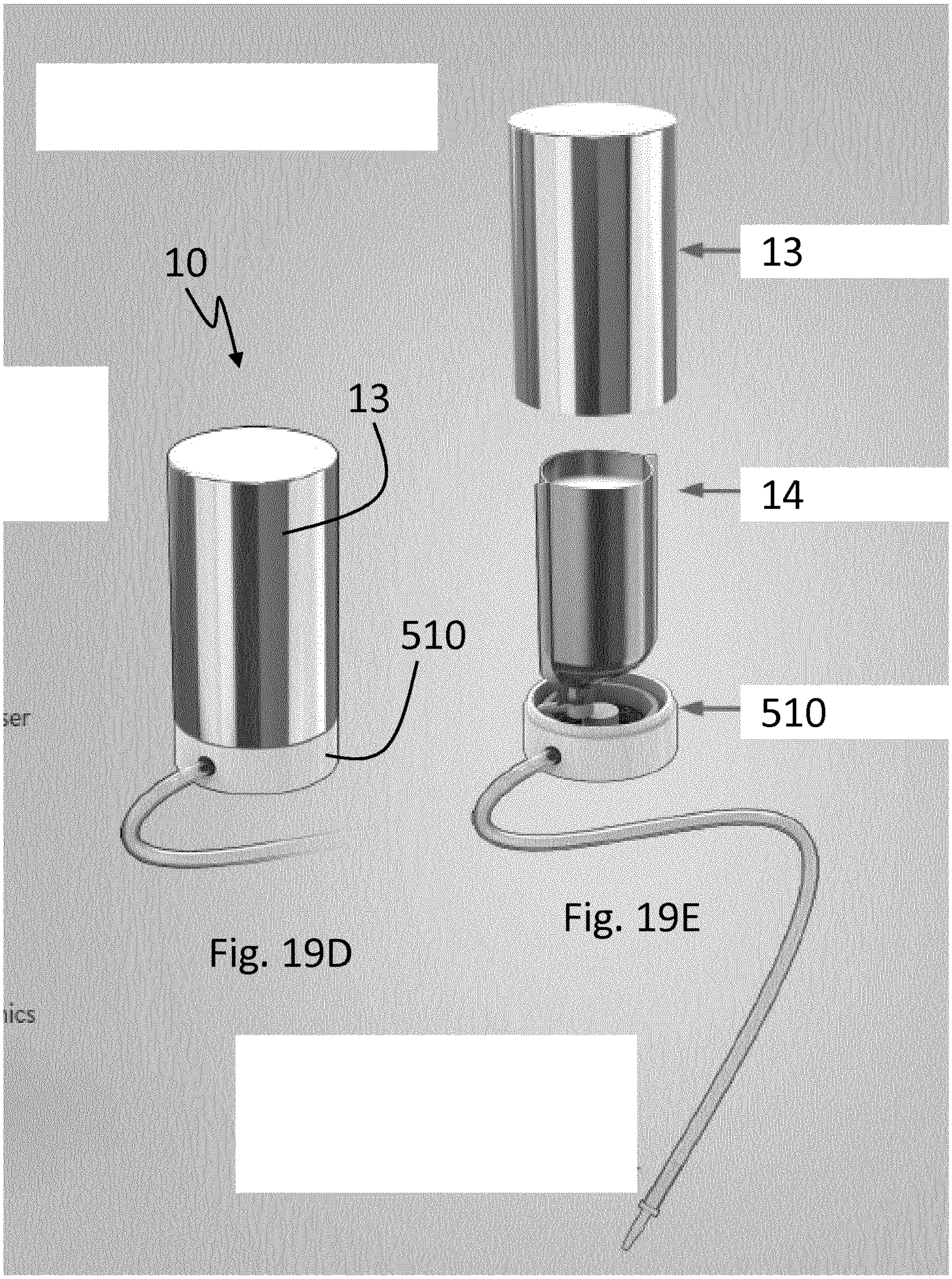
Figure 20A:
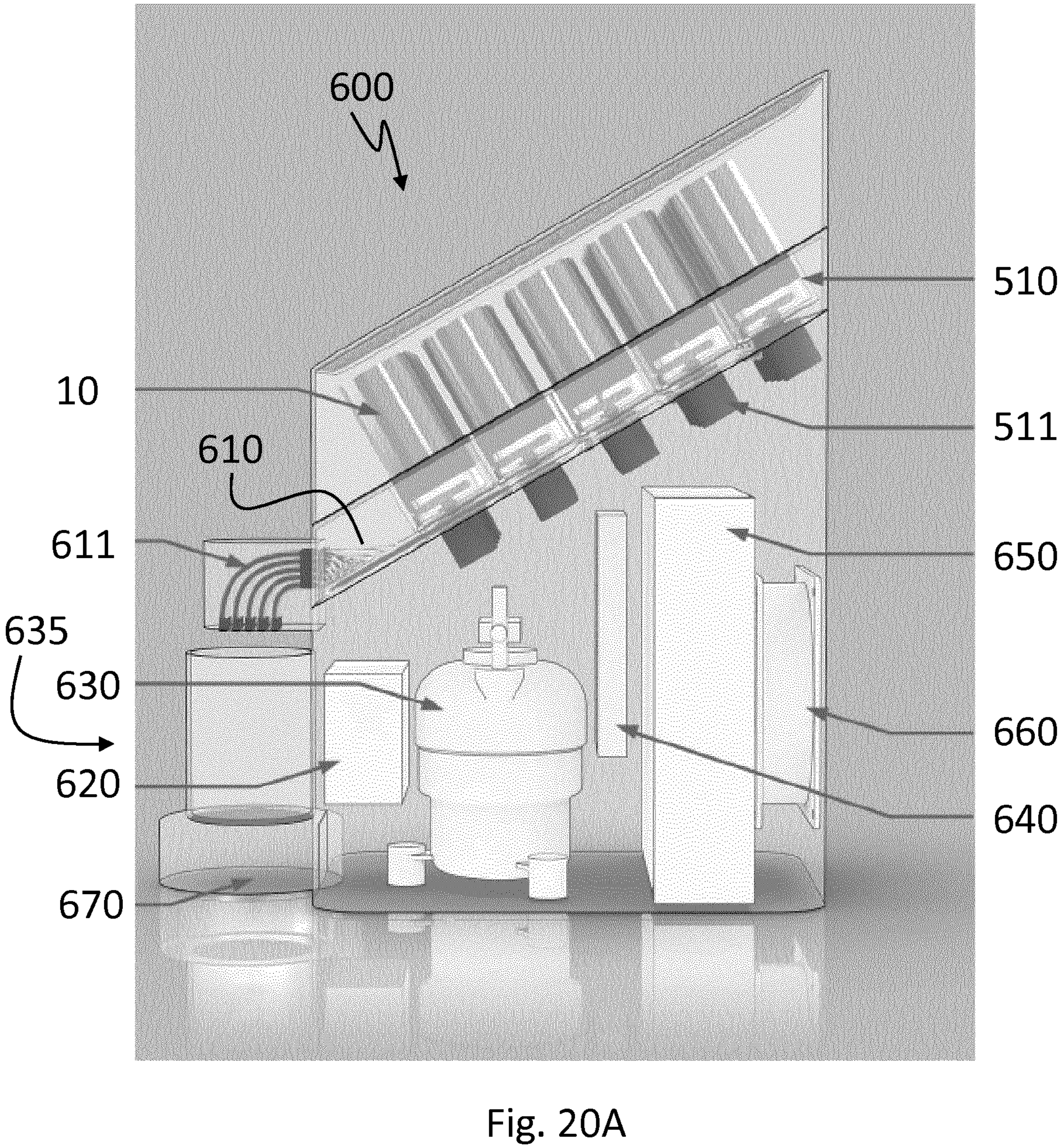
Figure 20B:
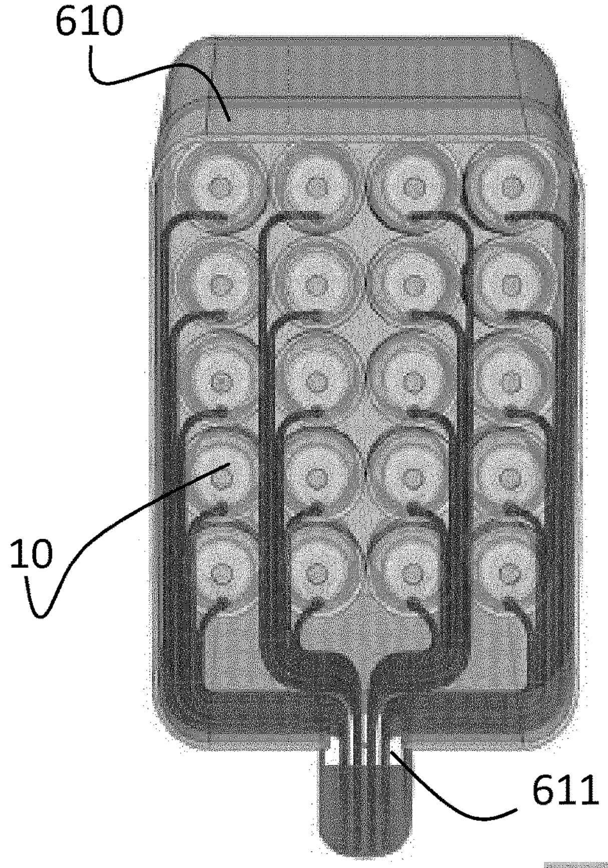
Figure 20C:
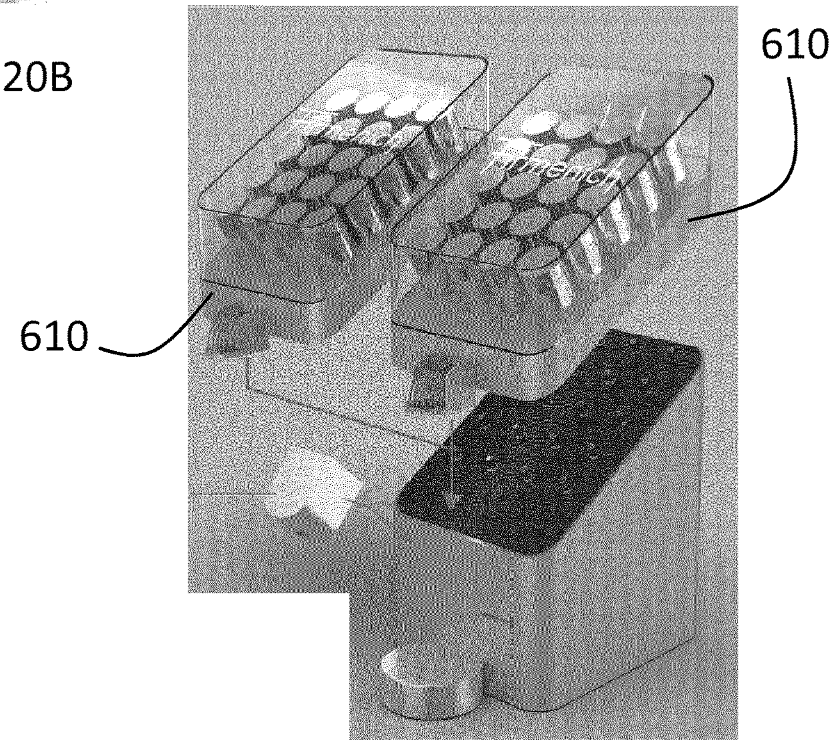
Figures 21A, 21B:
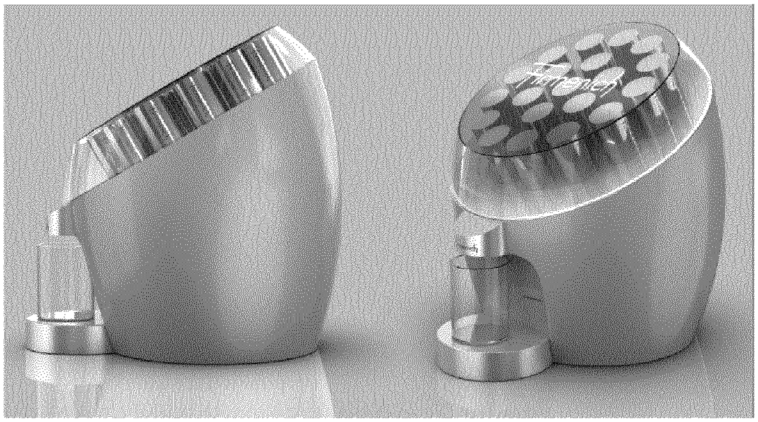
Figures 22A, 22B:
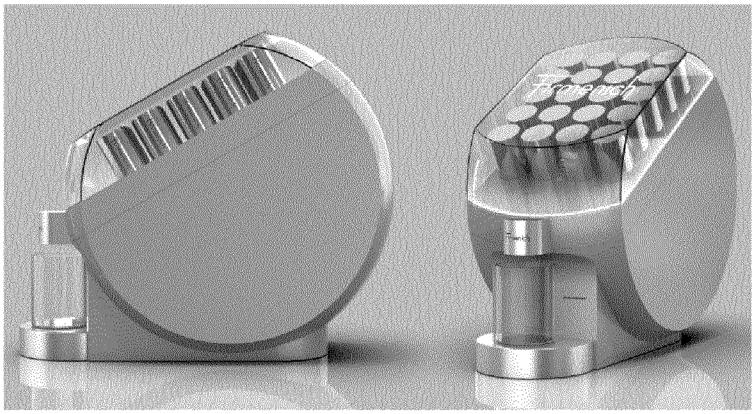
Figures 23A, 23B:
Figure 23C:
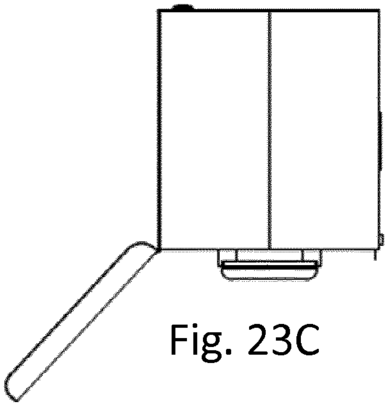
Figure 23D:
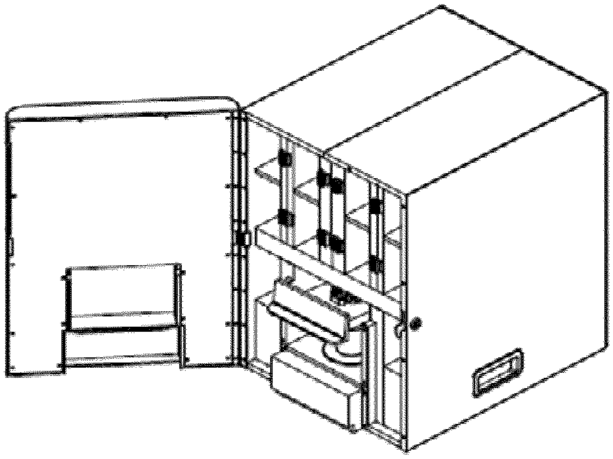
Figure 23E:
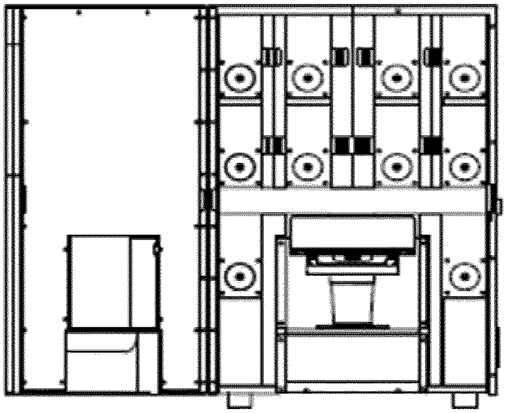

In the following, the invention is described exemplarily with reference to the enclosed figures, in which FIG. 1 is a schematic perspective view of an apparatus according to a first preferred embodiment of the invention, FIG. 2 is a side elevation view of the apparatus shown in FIG. 1, FIG. 3 is a top view of the apparatus shown in FIGS. 1 and 2, FIG. 4 is a further perspective view of the apparatus shown in FIGS. 1 to 3, FIG. 5 is a perspective view of the apparatus shown in FIGS. 1 to 4, wherein the housing is made transparent for schematically illustrating the components of the apparatus, FIG. 6A is a schematic perspective view of a first example of an apparatus according to a second preferred embodiment of the invention, FIG. 6B is a schematic perspective view of a second example of an apparatus according to the second preferred embodiment of the invention, FIG. 7 is a schematic perspective view of the apparatus shown in FIG. 6A, wherein several parts of the apparatus have been omitted or made transparent for schematically illustrating several components of the apparatus, FIG. 8 is a schematic perspective view of an apparatus according to a third preferred embodiment of the invention, FIG. 9 is a schematic perspective view of the apparatus shown in FIG. 8, wherein several parts have been omitted for schematically illustrating several components of the apparatus, FIG. 10 is a schematic perspective view of a preferred container for the invention, FIG. 11 shows a preferred manipulator with a preferred pipette for the invention in a cross-sectional side view, FIG. 12 shows a top view of a preferred pump for the manipulator of FIG. 11, FIG. 13 shows a schematic perspective view of a preferred balancer for the manipulator of FIG. 11 and the pump of FIG. 12, FIG. 14 is a schematic perspective view of a preferred pipette box for the pipette station according to the present invention, FIG. 15 schematically shows a graph of a preferred system according to the invention, FIGS. 16A and 16B are schematic perspective views of an example of a moving mechanism for the output of the apparatus, FIG. 17 is a perspective of a further example of a moving mechanism for the output of the apparatus, FIGS. 18A-D are schematic perspective views (FIGS. 18A-C) and a front view (FIG. 18D) of a further embodiment of the apparatus, FIG. 19A is a schematic perspective view a further embodiment of the apparatus, FIGS. 19B-E are schematic perspective views of an example of a container for the apparatus of FIG. 19A, FIGS. 20A and 20B are a schematic side view (FIG. 20A) and a schematic top view (FIG. 20B) of a further embodiment of the apparatus, FIG. 20C is a schematic perspective view of the apparatus of FIGS. 20A and 20B with an example for interchangeable retainers, FIGS. 21A and 21B are a schematic side view (FIG. 21A) and a schematic perspective view (FIG. 21B) of a further embodiment of the apparatus;

FIGS. 22A and 22B are a schematic side view (FIG. 22A) and a schematic perspective view (FIG. 22B) of a further embodiment of the apparatus;

FIGS. 23A and 23B are a schematic perspective view (FIG. 23A) and a schematic front view (FIG. 23B) of a further embodiment of the apparatus, and FIGS. 23C-E are a schematic top view (FIG. 23C), a schematic perspective view (FIG. 23D), and a schematic front view of the apparatus of FIGS. 23A and 23B, wherein the door for covering the retainer is opened for accessing the retainer respectively containers.

First, the respective features of the preferred embodiments of the apparatus are explained. Then, the functioning of the control unit and the communication is explained with respect to all the embodiments.

FIGS. 1 to 9 show preferred embodiments of the apparatus 100, 200, 300. The apparatus 100, 200, 300 preferably has a size for carrying the apparatus 100, 200, 300. As such, the apparatus 100, 200, 300 may be a personal machine, which may be placed in a laboratory or in any different location, in particular a location having room temperature. Therefore, a user may be equipped with the apparatus 100, 200, 300 so that the user can produce customized flavoring agents tailored to his specific needs. As can be seen in the figures, the apparatus 100, 200, 300 has a compact form, in particular having approximately the size of a microwave or the size of about 250 mm×350 mm×20 mm or less, e.g. 50 mm×60 mm×50 mm. The apparatus 100, 200, 300 may be compact enough to be carried to a customer location, e.g. for demo purposes. That is, the apparatus 100, 200, 300 has a size that is adapted to be integrated in a lab bench, in particular enabling a safe, clean and free of order lab. The apparatus may be designed such that after transportation of the apparatus, the apparatus is ready for use within 30 minutes. For operating the apparatus 100, 200, 300, the apparatus may comprise a power or electric plug and/or a water access. The apparatus 100, 200, 300 thus provides an availability enabling instant mixing of flavoring agents, so that the right (composite) flavoring agent is quickly achieved.

FIGS. 1 to 5 show an apparatus 100 according to the first embodiment. As can be seen in FIG. 5, the apparatus 100 comprises a retainer or storage 110 for retaining at least two containers 10 (i.e., input container). The retainer 110 preferably comprises areas corresponding to the containers 10, so that the containers 10 are securely retained or received by the retainer 110. In particular, the retainer 110 may be adapted, so that the apparatus 100 only functions with specific containers being received by the retainer 110. For example, the areas of the retainer 110 for receiving the containers 10 may comprise mechanical and/or electronical means, which can cooperate with corresponding mechanical and/or electronical means in the containers 10, so that only in a certain cooperation between these electronic and/or mechanical components the apparatus 100 functions.

The apparatus 100, in particular the retainer 110 may further comprise coding means (not shown) for obtaining information about a particular flavoring agent held within the container 10 in the retainer 110 of the apparatus. The coding means may comprise a sensor such as a QR-, barcode—or an RFID reader. The coding means are preferably designed to retrieve information about the content of a particular container from identification means such as a barcode or RFID tag provided on the container to be inserted into the retainer of the apparatus. The information may be retrieved directly from the container 10 or may be retrieved via associating the obtained information from the container with information retrieved via the remote server by means of the communication unit.

The retainer holds the containers within the retainer for easier handling of a family of containers. For example, a family of containers can be grouped by type of flavor (e.g., strawberry) or type of use (e.g., a particular project). The retainer is preferably interchangeably provided with respect to the apparatus, e.g. such that a first family of containers in a first retainer can be easily interchanged with a second family of containers in a second retainer.

In the preferred embodiment shown in FIGS. 1 to 5, the retainer 110 has a substantially circular form, so that the retainer 110 retains the containers 10 in a substantially circular manner. The present invention is, however, not limited to retaining the containers 10 in a circular manner. In particular, the retainer 110 may also retain the containers 10 in a grid manner or any other manner suitable for retaining the containers 10.

The retainer no is designed for retaining at least two containers 10, wherein each container 10 comprises or contains a flavoring agent (ingredient of the new flavoring agent), e.g. in a liquid form. The viscosity of the flavoring agent may be in the range of 1-400 mPas (Liquid Sugar Syrup at 71 Brix) at room temperature (21° C.). The typical density of the flavoring agent may be from 0.79 g/cm3 to 1.16 g/cm3 (e.g., mainly determined by ethanol, propylene glycol, triacetin, or vegetable oil as these are the most common solvents—Ethanol 0.79 g/cm3, Vegetable Oil 0.91, Water 1.0, Propylene glycol 1.04, Triacetine 1.16). The flavoring agent may be such that they preserve their intended properties at room temperature for at least 1 day from first exposure. The flavoring agent may be such that when exposed to breathable air the flavoring agent does not lose its properties for at least 1 day from first exposure (e.g. having 21% Oxygen, 50% RH). The pH value of the flavoring agent may be between 3 to 8.5. The flavoring agent may have an electrical conductivity between 0 to 225 mS/cm at room temperature (25% NaCl solution).

As can be seen in FIG. 5, the retainer 110 may also retain more than two containers, in particular 24 containers 10. In the retainer 110, the containers 10 may be provided next to each other, in particular on lines next to each other or on circles having different diameters. More specifically, the retainer 110 may comprise a first circle with first container and a second circle with second containers.

The apparatus 100 further comprises at least one collecting and dispensing unit for collecting and dispensing flavoring agents. As can be seen in FIG. 5, the at least one collecting and dispensing unit may be a manipulator 120 for collecting and dispensing flavoring agents. The manipulator 120 is in particular designed to reach and access a container 10, preferably the at least two containers 10, more preferably all containers. Accessing of the respective container may be accomplished by means of a manipulator head or a pipette being received in the manipulator head. The manipulator head may be provided at the distal end of a manipulator arm of the manipulator 120.

For reaching a container, the manipulator 120 may comprise one or at least two degrees of freedom. In the embodiment shown in FIG. 5, the manipulator 120 may comprise two translational degrees of freedom, e.g. one degree of freedom for moving the manipulator 120 from one container 10 to another container 10 and another degree of freedom for accessing the respective container. The manipulator 120 may also comprise three degrees of freedom, namely two degrees of freedom for moving the manipulator 120 in a plane parallel to the containers 10, and one degree of freedom for moving that manipulator 120 perpendicular to this plane for accessing the respective container 10. The manipulator may alternatively comprise only two degrees of freedom, wherein the further degree of freedom for reaching each container 10 is provided by way of the retainer 110. For providing the degree of freedom by way of the retainer 110, the retainer 110 may be movably, preferably rotatably provided with respect to the manipulator 120. With this configuration, the manipulator 120 may only be moved in a plane being spanned by the movement components of the two (translational) degrees of freedom. The moveable retainer 110, thus, can move each container 10 to or in this plane, so that the manipulator 120 can access each of the containers 10. By way of this arrangement, the manipulator 120 and, thus, the apparatus 100 can be made compact.

The manipulator 110 is further adapted to collect and dispense flavoring agents. The manipulator 110 or the manipulator head may comprise a dispensing element (not shown), e.g. a pipette, by way of which the manipulator 110 can access the respective container. The dispensing element may thus me designed to collect or extract a defined amount of flavoring agent from container 10 and to subsequently dispense this defined amount of flavoring agent.

The apparatus 100 further comprises a mixer 130 for mixing flavoring agents for obtaining a new flavoring agent, i.e. a flavoring agent having ratios being composed of other flavoring agents. It is also possible to use the mixer 130 to mix flavoring agents together with food ingredients (e.g. water, colorant, vitamins) to obtain a ready to consumer food or beverage. The food ingredients may be manually or automatically (e.g. by the collecting and dispensing unit) provided in the mixer 130. For mixing, the mixer 130 may comprise a stirrer. The stirrer may be driven by a motor. The stirrer may be provided in the mixer 130 as a rotary mixer, e.g. a magnetic stirrer or a stirrer provided on a shaft. The mixer 130 is preferably configured for contact free mixing of the flavoring agents. For example, the mixer 130 may be equipped with a spinning mechanism through which the mixing can occur through creating a vortex in the liquid of the new flavoring agent. Other contact free mixing configurations may comprise a mechanism for vibrating the mixer 130 for mixing the liquid of the new flavoring agent, e.g. a shaking plate, and/or an ultrasound generator for mixing the liquid of the new flavoring agent by way of ultrasound. Mixing by the mixer 130 may also be effected without a (electronically driven) mixing mechanism. For example, the mixer 130 may be adapted such that the user of the apparatus can mix the new flavoring agent by hand.

The mixer 130 may be provided in the apparatus 100 such that the manipulator 120 can reach and preferably access the mixer 130. In the preferred embodiment shown in FIG. 5, the mixer 130 is provided next to and/or under the manipulator 120. Reachability of the mixer 130 for the manipulator is, however, not required. For example, the mixer 130 may also be fluidly connected with the manipulator 120, e.g. by way of tubes, so that the manipulator 120 can dispense the flavoring agent to the mixer 130. Preferably, the mixer 130 is provided next to the retainer 110. Thus, the apparatus 100 can be made compact.

The apparatus 100 further comprises a control unit or PCB (printed circuit board) 140 for controlling at least the manipulator 120 and the mixer 130. As such, the control unit 140 in particular controls the dispensing and collecting of flavoring agent by means of the manipulator 120. More specifically, the control unit 140 may control the degrees of freedom of the manipulator 120. If the retainer 110 has also a degree of freedom, so that the manipulator 120 can access each of the containers, the control unit 140 is also provided for controlling the movements of the retainer 110 with respect to the manipulator 120.

The control unit 140 is also configured to control the mixer 130. More specifically, the control unit 140 may control several mixing parameters of the mixer 130, e.g. mixing time, mixing movements (e.g. rotational speed and/or acceleration of the mixer, and/or rotational speed- and/or acceleration-profiles of the mixer).

The above described coding means may be connected to the control unit 140. The control unit 140 is preferably further designed for associating a particular container to a particular position within the retainer 110 of the apparatus 100, so that the control unit 140 thus controls the manipulator 120 correspondingly. Thereby, the control unit 140 may be designed for associating information obtained about the container, e.g. by dedicated coding means or by a user input, to a particular position within the retainer 110. The position within the retainer 110 for a particular container to be inserted into the apparatus 100 may be chosen and/or set automatically by the control unit 140 or may be inputted by the user. Accordingly, the control unit 140 is preferably designed to control and/or track information about the containers and their contents held within the retainer 110 of the apparatus 100. The control unit 140 may be configured to record data about the individual runs for obtaining a new flavoring agent (e.g., date, volume, formula).

The control unit may also comprise a display unit 141. By way of the display unit 141 the apparatus 100 may be maintained and/or processing parameters, e.g. of the mixer 130 and/or of the manipulator 120, may be monitored. The display unit 141 may also be adapted for adjusting the type and/or defined amount of a specific flavoring agent to be collected and dispensed. In the preferred embodiment shown in FIGS. 1 to 5 the control unit 140 is provided next to the mixer 130 and, preferably, such that the display unit 141 is accessible or at least readable from outside of the apparatus 100.

As can be seen in FIG. 5, the apparatus 100 may also comprise a cooling unit or system 150 for cooling at least the containers 10 being retained in the retainer 110. In particular, the cooling unit 150 may effect a flow of heat from the containers 10 to the cooling unit 150 so that containers 10 are cooled. The effected cooling temperature of the containers 10 may be, e.g., 5 to 10 degrees Celsius, in particular 6 to 10 degrees Celsius. In the preferred embodiment shown in FIG. 5, the cooling unit 150 is preferably provided next to the mixer 130. In particular, in a top view of the apparatus 100, the manipulator 120 or at least a plane being spanned by two of the movement components may intersect with the mixer 130 and/or the manipulator 120 may be provided between the cooling unit 150 and the mixer 130 and/or between the cooling unit 150 and the control unit 140.

As can be seen in FIG. 5, the apparatus 100 may also comprise a pipette station 160 comprising a plurality of pipettes, e.g. provided in a pipette box. The pipette station 160 may be provided in the apparatus 100 such that the manipulator 120 can reach and access the pipette station 160 for collecting, taking or grasping a pipette from the pipette station 160. For example, the manipulator 120 may have at least two, in particular three degrees of freedom for reaching and accessing the pipette station 160, e.g. by means of the head of the manipulator 120. In the preferred embodiment shown in FIG. 5, the pipette station 160 is provided on the retainer 110. That is, the containers 10 may be provided next to the pipette station 160. With the pipette station 160 on the retainer 110, the pipette station 160 may be reachable for the manipulator 120 by movably providing the retainer 110 with respect to the manipulator 120.

The head of the manipulator 120 may therefore be adapted to grasp a pipette from the pipette station 160. The head of the manipulator 120 may be adapted to control the pipette in the way that the pipette can access the respective container to collect a defined amount of a specific flavoring agent and to subsequently dispense this flavoring agent. For example, collecting and dispensing of the flavoring agent by means of the pipette may be effected by way of pressure differences and/or capillary forces.

The apparatus 100 may also comprise a pipette disposal station (not shown), in which the manipulator may dispose of used pipettes. The pipette disposal station may be provided so that the manipulator 120 can reach and preferably access the pipette disposal station. In particular, the manipulator 120 may only be moved above the pipette disposal station. Subsequently, the manipulator 120, in particular its head, releases the used pipette for disposing of the pipette in the pipette disposal station. For example, the pipette disposal station may be provided next to the pipette station 160. Alternatively, the pipette disposal station may also be provided in the vicinity or next to the mixer 130, the control unit 140 and/or the cooling unit 150. The pipette disposal station may be provided such that the pipette disposal station can be accessed for the user of the apparatus 100 from outside of the apparatus 100, e.g. by means of the pipette disposal station being provided as a drawer.

As can be seen in FIG. 5, the apparatus 100 may further comprise a pump 170. The pump 170 may be provided for pumping flavoring agents with respect to the containers 10, the manipulator 120 and/or the mixer 130. In particular, the pump 170 may be connected with the manipulator 120, in particular with its head, for providing pressure differences for collecting and dispensing flavoring agents, e.g. by way of the pipette being held by the head of the manipulator 120. More specifically, the pump 170 may provide a low-pressure for collecting flavoring agents from the containers 10 and a high-pressure for dispensing the flavoring agents in the mixer 130. The pump 170 may be functionally connected with the control unit 140 for collecting and dispensing the respective flavoring agent. The pump 170 is preferably provided next to the retainer 110, preferably in a free space between the retainer 110 and the cooling unit 150.

FIG. 5 shows that the apparatus 100 may comprise a printing unit 180. The printing unit 180 may be provided and configured to print a label, e.g. in a human readable and/or machine readable form such as letters, barcode and/or QR-code. The label may include several information about the new flavoring agent, in particular the composition of the flavoring agent and/or the flavoring agents being used for the new (composite) flavoring agent. The label may also include processing parameters or other information with respect to the new flavoring agent. For gathering this information, the printing unit 180 may be connected with the control unit 140. The printing unit 180 may comprise a paper roll 181 and a printer 182 for printing on the paper roll. The printing unit 180 may be provided next to the control unit 140, in particular with the control unit 140 between the mixer 130 and the printing unit 180. Preferably, the printing unit 180 is provided next to the cooling unit 150. In particular, the printing unit 180 may be provided in a lateral end region of the apparatus 100. As can be seen in FIGS. 1 and 4, the printing unit 180 may be provided in the apparatus 100 such that by way of a slot 183 a printed label can be issued out of the apparatus 100. The paper roll 181 may be provided at the back of the printer 182 with the slot 183 in the front of the printer 182.

The apparatus may, as shown in FIG. 5, comprise a motor or (two) motors 190 (191, 192) for operating at least the manipulator 120 and/or the mixer 130. As can be seen in FIG. 5, the motors 190 may be provided separately from and/or at a distance to the mixer 130 and/or the manipulator 120. The manipulator 120 and/or the mixer 130 can thus be operated by means of the motors 190 by way of corresponding transmission elements or systems connecting the motors 190 with the manipulator 120 and/or the mixer 130. In particular, the control unit 140 may be connected with the motors 190 for controlling the respective components. The motors 190 may be provided in the apparatus 100 next to the control unit 140 and/or the cooling unit 150, in particular with the control unit 140 between the mixer 130 and the motor 191 of the motors 190. The motor 192 may be provided next to the cooling unit 150. The printing unit 180 may be provided on top of the motors 190, in particular on top of motor 191 and/or motor 192.

As can be seen in FIGS. 1 to 5, the apparatus 100 may further comprise a housing 115. The housing 115 houses at least the retainer 110, the pipette station 160, the pipette disposal station, the cooling unit 150, the manipulator 120 and/or the mixer 130. More specifically, as shown in the preferred embodiment shown in FIG. 5, the housing 115 may be composed of a front housing part 116 and a back housing part 117, which preferably merge with one another. The front housing part 116, which has preferably a substantially cylindrical form, houses at least the retainer 110 and/or the pivot station 160. The back housing part 117, which preferably has a substantially box-shaped form, houses at least the mixer 130, the control unit 140, the cooling unit 115, the pump 170, the printing unit 180 and/or the motors 190. The manipulator 120 is preferably provided in the housing 115 such that the manipulator 120 can move both in the front housing part 116 and in the back housing part 117.

As can be seen, e.g., in FIG. 4, the housing 115 may be partially transparent, at least in the part of the part of the housing 115 housing the retainer 110, so that a user of the apparatus 100 can observe the containers 10 in the apparatus 100 through this transparent part. The transparent part of the housing 115 may be provided by means of a window or transparent cover 118.

The housing 115 may further comprise a preferably removable lid 119 for selectively opening and closing the housing for accessing the retainer 110 with the containers 10 inside of the housing 115. The lid 119 may be provided such that the user can access the retainer 110 from above of the apparatus. The lid 119 may be provided in the front housing part 116 of the housing 115.

As can be seen, in particular, in FIG. 4, the apparatus 100 may further comprise an output (area) 135 for outputting the new flavoring agent. The output 135 may be provided as an opening and/or hatch. The output 135 may be provided in the housing 115, in particular in the back housing part 117. The output 135 may comprise a door or the like for selectively opening and closing the output 135. The output 135 may be integrated in the mixer 130, e.g. that a user can access the mixer 130 by way of the output 135 for taking out the new flavoring agent. The new flavoring agent may be provided in a new container (i.e., an output container) so that a user can take out the new container from the output 135. The output 135 may be transparent for observing the new flavoring agent from outside of the apparatus 100, i.e. in particular the new flavoring agent inside of the mixer 130. The output 135 may be provided such that a user can directly access the mixer 130 by way of the output 135.

The output 135 may comprise a moving mechanism, e.g. a moving rack, that is configured to receive the new container and a next (new) container and to move the new container to make space for the next container to be filled with the new flavoring agent. The next container is preferably placed adjacent to the new container, which in one position of the moving mechanism is filled with the new flavoring agent. Preferred examples of the moving mechanism are shown in FIG. 16 and in FIG. 17. In both examples, the moving mechanism is arranged to go through the apparatus; in other words, in at least one position of the moving mechanism, in particular in the position of providing the output container in the output 135, the apparatus, in particular the housing of the apparatus, and the moving mechanism overlap in a top view of the apparatus.

As can be seen in FIG. 16, the moving mechanism 136, e.g. a moving rack, is (designed) in a circular form (e.g. designed as a turntable) and moves the output container in a circular fashion to make place for the next container. The moving mechanism 136 may be arranged such that the rack moves through the output 135, thereby taking out the filled container containing the new flavoring agent out of the mixer 130 and moving the next (empty) container into the mixer 130 by only one rotational movement of the moving mechanism. The circular shape has the advantage of keeping a compact form of the apparatus in combination with the moving mechanism, in particular in all positions of the moving mechanism.

Alternatively and as can be seen in FIG. 17, the moving mechanism may be in a rectangle form, moving the output containers in substantially straight lines away from the output (vertically or horizontally) in order to make space for the next container. According to this embodiment, the moving mechanism may be arranged as a drawer, which is preferably arranged beneath the mixer. The drawer may comprise a lifting mechanism, which is configured to provide the mixer 130 with an output container and to remove an output container from the mixer 130. In the rectangle form of the moving mechanism, the containers may be arranged in a grid manner, i.e. in multiple parallel lines, or along a single straight line, e.g. according to an arrangement in slide projector trays.

The output 135 may comprise a light for lighting the new flavoring agent. As such, the user of the apparatus can easily assess the new flavoring agent with respect to its appearance. The light may be provided inside of the output 130.

FIGS. 6A, 6B and 7 show a second preferred embodiment of an apparatus 200. The apparatus 200 comprises a retainer 210. The retainer 210 substantially corresponds to the retainer 110. What was said with respect to the retainer 110 thus applies to the retainer 210 correspondingly, if not otherwise stated. As can be seen in FIG. 7, the containers 10 are retained in the retainer 210 in a circular manner, preferably such that the containers 10 surround a free space on the retainer 210, e.g., for components of the apparatus 200. In particular, the containers 10 may be retained in the retainer 210 on a single circle.

The apparatus 200 further comprises a manipulator 220 for collecting and dispensing flavoring agents from the containers 10. The manipulator 220 substantially corresponds to the manipulator 120. What was said with respect to the manipulator 120 thus applies to the manipulator 220 correspondingly, if not otherwise stated. The manipulator 220 differs from the manipulator 120, in particular, in that the manipulator has a rotational degree of freedom for reaching the containers. By way of this rotational degree of freedom of the manipulator 220, the manipulator 220, in particular its head, may be moved along a circle, on which the containers 10 are provided. Alternatively, this degree of freedom may also be provided by movably, in particular rotatably providing the retainer 210 with respect to the manipulator 220. The manipulator 220 may further comprises a translational degree of freedom for moving the manipulator 220, in particular its head, along the radius of the circle being defined by the rotational degrees of freedom. Preferably, the manipulator 220 is provided on the retainer 210, in particular such that the rotational axis of the rotational degree of freedom is surrounded by the containers 10. Preferably, the rotational axis of the rotational degree of freedom is provided in the center of the retainer 210.

The apparatus 200 further comprises a mixer 230. The mixer 230 substantially corresponds to the mixer 130. What was said with respect to the mixer 130 thus applies to the mixer 230 correspondingly, if not otherwise stated. The mixer 230 differs from the mixer 130, in particular, in the arrangement with respect to the manipulator 220. As can be seen in FIG. 7, the mixer 230 is provided on the retainer 210, in particular in the free space on the retainer being formed by the containers 10 so that the containers 10 surround the mixer 230. The mixer 230 may be provided such that an axis of the mixer 230, e.g. the symmetrical axis, corresponds to the rotational axis of the rotational degree of freedom of the manipulator 220. In particular, the mixer 230 may support the rotational axis of the manipulator 220. As such, the manipulator 220, i.e. the head of the manipulator 220 for reaching and accessing the containers, may reach the mixer 230 by way of the translational degree of freedom along the radius of the circle being defined by the rotational degree of freedom. In this way, the manipulator 220 may dispense the flavoring agent to the mixer 230. Alternatively, the manipulator 220 may also dispense the flavoring agent to the mixer by way of a fluid connection, e.g. a tube, fluidly connecting the manipulator 220 and the mixer 230, so that the manipulator only requires one degree of freedom, e.g. the rotational degree of freedom. With these configurations of the manipulator 220, a very compact design of the manipulator 220 with the retainer 210 and the mixer 230 is provided.

The apparatus 200 also comprises a control unit (not shown) substantially corresponding to the control unit 140. What was said with respect to the control unit 140 thus applies to the control unit of apparatus 200 correspondingly, if not otherwise stated. The control unit of the apparatus 200 may be provided under or in the retainer 210 or in an upper part of the apparatus 200.

The apparatus 200 may, as can be seen in FIG. 7, comprise a solvent tank 240. The solvent tank 240 is preferably removably provided with respect to the apparatus 200 or the retainer 210. The solvent tank 240 includes a solvent, which may be also collected and dispensed by means of the manipulator 220 to the mixer 230. Therefore, the control unit of the apparatus 200 may further be configured for controlling the manipulator 220 such that the manipulator 220 collects solvent from the solvent tank 240 and dispenses the solvent to the mixer 230. Preferably, the solvent tank 240 is provided on the retainer 210 next to the containers 10 so that the containers 10 surround the solvent tank 240.

The apparatus 200 may also comprise a pipette station 250 with a plurality of pipettes. The pipette station 250 substantially corresponds to pipette station 160. What was said with respect to the pipette station 160 thus applies to the pipette station 250 correspondingly, if not otherwise stated. The pipette station 250 may be provided on the retainer 210, such that the pipette station 250 is surrounded by the containers 10. Preferably, the pipette station 250 is provided next to the mixer 230 and/or the manipulator 220.

FIG. 7 shows exemplarily that the apparatus 200 may also comprise a pipette disposal station 260, substantially corresponding to the pipette disposal station as described with respect to the apparatus 100. What was said with respect to the pipette disposal station of the apparatus 100 thus applies to pipette disposal station 260 correspondingly, if not otherwise stated. As can be seen in FIG. 7, the pipette disposal station 260 may be provided as a drawer in the apparatus 200. The pipette disposal station 260 may be provided as a drawer in the retainer 210, such that the drawer is accessible for the manipulator 220 by way of an opening 261 being provided in the retainer 210. The opening 261 is preferably provided in the free space on the retainer 210 being surrounded by the containers 10. In a first position, the pipette disposal station 260 is accessible for the manipulator 220 by way of the retainer 210 or the opening 261. In a second position, the pipette disposal station 260 is accessible for the user from outside of the apparatus 200 by way of the retainer 210, e.g. by way of drawing out the drawer from the retainer 210, so that the user can remove the used pipettes from the pipette disposal station 260.

In FIG. 7 it is also shown that the apparatus 200 may comprise a pump 270, substantially corresponding to the pump 170 of the apparatus 100. What was said with respect to the pump 170, thus, applies to the pump 270 correspondingly, if not otherwise stated. The pump 270 differs from the pump 170, in particular, in the arrangement inside of the apparatus 200. More specifically, the pump 270 is provided on the retainer 210, in particular in the free space on the retainer 210 so that the pump 270 is surrounded by the containers 10. As can be seen in FIG. 7, the pump 270 may be provided next to the mixer 230, the solvent tank 240, and/or the pipette disposal station 260, in particular such that the pump 270 is provided between the solvent tank 240 and the pipette disposal station 260 when viewed in a top view of the apparatus 200.

The apparatus 200 may further comprise a reading unit 285, e.g. a QR-, Barcode-, or RFID-Reader. The reading unit 285 may be configured to read information or data being provided with respect to the container, e.g. type or composition of the respective flavoring agent. The reading unit 285 may be connected with the control unit for supplying the control unit with this information or data. Preferably, the reading unit 285 is provided in the retainer 210.

As can be seen in FIGS. 6A and 6B, the apparatus 200 may also comprise a printing unit 280 substantially corresponding to the printing unit 180. What was said with respect to the printing unit 180, thus, applies to the printing unit 280 correspondingly, if not otherwise stated. As can be seen in FIG. 6A, the printing unit 280 differs from the printing unit 180, in particular, in that the printing unit 280 is arranged in an upper part of the apparatus 200. More specifically, the printing unit 280 may comprise a slot 283 being provided in the upper part of the apparatus 200, wherein by way of the slot 283 a printed label can be issued out of the apparatus 100. Alternatively and as shown in FIG. 6B, the printing unit 280 may also be provided in a lateral part of the apparatus 200.

As can be seen in FIG. 6, the apparatus 200 may further comprise a motor or motors 290, which correspond in their functionality substantially to the motor 190. What was said with respect to the motor 190, thus, applies to the motor 290 correspondingly, if not otherwise stated. The motors 290 may be positioned on the retainer 210, in particular surrounded by the containers 10 being retained in the retainer 210. The motor 290 may be provided next to the mixer 230, in particular with the mixer 130 between the pump 270 and the motor 290.

FIG. 6 shows exemplarily that the apparatus 200 may also comprise an output 235 for outputting the new flavoring agent. The functionality and structure of the output 235 substantially corresponds to the functionality and structure of the output 135. What was said with respect to the output 135, thus, applies to the output 235 correspondingly, if not otherwise stated. The output 235 differs from the output 135, in particular, in that the output 235 outputs the new flavoring agent, e.g. provided in a new container, in a direction upwards with respect to the apparatus 200. As such, the output 235 may be adapted and/or comprise a lifting mechanism for lifting the new flavor agent in a direction upwards of the apparatus 200, preferably out of the apparatus 200, and away from and/or out of the mixer 230.

Despite not shown in FIGS. 6A to 7, the apparatus 200 may also comprise a cooling unit. The cooling unit may substantially correspond to the cooling unit 150. What was said with respect to the cooling unit 150, thus, may apply to the cooling unit of the apparatus 200 correspondingly, if not otherwise stated. In particular, the cooling unit may be provided on the retainer 210.

As exemplarily shown in FIG. 6, the apparatus 200 may further comprise a housing 215. The housing 215 houses at least the retainer 210, the pipette station 250, the pipette disposal station 260, the cooling unit, the manipulator 220, and/or the mixer 230. More specifically, as shown in the preferred embodiment shown in FIG. 6A, the housing 215 may have a preferably single form, e.g. a circular, polygonal or rectangular form, when viewed in a top view of the apparatus 200. The form or part of the form of the housing 215 in a top view of the apparatus 200 may substantially correspond to the form of the retainer 210 with respect to geometry and/or size of the form of the retainer 210. The housing 215 may comprise an upper housing part 216 and a lower housing part 217. The upper housing part 216, which has preferably a substantially cylindrical form, may house at least the printing unit 280. The lower housing part 217, which has preferably a substantially cylindrical form, may house at least the mixer 230, the solvent tank 240, the pump 270, and/or the motor 290. The manipulator 220 is preferably provided only in the lower housing part 217.

As can be seen in FIG. 6, the housing 215 may be transparent, at least in the part of the part of the housing 215 housing the retainer 210, so that a user can observe the containers 10 in the apparatus 200 through this transparent part. The transparent part of the housing 215 may be provided by means of a window 218. Preferably, the transparent part of the housing 215 extents about the complete circumference of the housing 215.

The housing 215 may further comprise a preferably removable lid 219 for selectively opening and closing the housing 215 for accessing the retainer 210 with the containers 10 inside of the housing 215. The lid 219 may be provided in the upper housing part 216 of the housing 215 or form the upper housing part 216.

The upper housing part 216 may further comprise a user interface such as a display unit and/or control elements. The upper housing part 216 may also comprise lighting elements, e.g. an LED, for signaling processing parameters such as on, off and/or standby. The user interface may also be provided separately or externally from the apparatus 200, e.g. by means of a portable device such as a tablet, laptop, mobile phone. The lower housing part 217 may comprise ventilation slots 219 for dissipating heat of the apparatus 200, e.g., heat dissipating due to the cooling of the containers 10.

FIGS. 8 and 9 show a third preferred embodiment of an apparatus 300. The retainer 310 substantially corresponds to the retainer 110. What was said with respect to the retainer 110 thus applies to the retainer 310 correspondingly, if not otherwise stated. The containers 10 are retained in the retainer 310 in a grid manner. In particular, the containers 10 may be retained in the retainer 310 on four rows, each comprising preferably six retaining areas for retaining containers 10.

The apparatus 300 further comprises a manipulator 320 for collecting and dispensing flavoring agents from the containers 10. The manipulator 320 substantially corresponds to the manipulator 120, so that what was said with respect to the manipulator 120 applies to the manipulator 320 correspondingly, if not otherwise stated. The manipulator 320 has preferably only translational degrees of freedom for reaching the containers, in particular three translational degrees of freedom standing perpendicular on one another. By way of these degrees of freedom, the manipulator 320 may be moved with respect to the retainer 310, on which the containers 10 are provided. Additionally or alternatively, one or more degrees of freedom may also be provided by movably, in particular translationally movably providing the retainer 310 with respect to the manipulator 320.

Preferably, the manipulator 320 comprises guiding elements 321, 322, 323, in particular in the form of a rail and/or a gear rack, for providing the translational degrees of freedom. Guiding element 323, preferably in the form of a gear rack, may be provided for accessing the respective container, wherein guiding elements 321, 322 may be provided to move the manipulating element 320 in a plane parallel to the containers 10. The guiding elements 321, 322, 323 are preferably provided above the retainer 310 and the containers 10.

The apparatus 300 further comprises a mixer 330. The mixer 330 substantially corresponds to the mixer 130. What was said with respect to the mixer 130 thus applies to the mixer 330 correspondingly, if not otherwise stated. The mixer 330 differs from the mixer 130, in particular, in the arrangement with respect to the manipulator 320. As can be seen in FIG. 9, the mixer 330 is provided on the manipulating element 320, in particular on the guiding element 322. As such, the mixer 330 moves with the manipulating element 320. As can be seen in FIG. 9, the manipulating element 320 may comprise a head 324, which is adapted for accessing a respective container 10 and collecting a flavoring agent from the respective container, e.g. by way of a pipette. The head 324 is preferably provided next to the mixer 330. The head 324 may be fluidly connected, e.g. by way of tubes, with the mixer 330, so that the flavoring agent collected by the head 324 can be dispensed in the mixer 324.

The apparatus 300 also comprises a control unit (not shown) substantially corresponding to the control unit 140. What was said with respect to control unit 140, thus, applies to the control unit of the apparatus 300 correspondingly, if not otherwise stated.

The apparatus 300 may also comprise a pipette station 350 with a plurality of pipettes. The pipette station 350 substantially corresponds to the pipette stations 160, 250. What was said with respect to the pipette stations 160, 250, thus, applies to the pipette station 350 correspondingly, if not otherwise stated. The pipette station 350 is arranged such that the manipulator 320 can reach the pipette station 350 for taking a pipette station from the pipette station 350. For reaching and accessing the pipette station 350, the guiding element 322 may extent above the pipette station 350, as shown in FIG. 9. The pipette station 350 may be provided next to the retainer 330 and/or the manipulator 320.

FIG. 9 shows exemplarily that the apparatus 300 may also comprise a pipette disposal station 360, substantially corresponding in their functionality and structure to the pipette disposal stations as described with respect to the apparatuses 100, 200. What was said with respect to these pipette disposal stations, thus, applies to the pipette disposal station 360 correspondingly, if not otherwise stated. The pipette disposal station 360 may be accessible for the user from outside of the apparatus 300, e.g. by way of the back of the apparatus 300, so that the user can remove the used pipettes from the pipette disposal station 360. Preferably, the pipette disposal station 360 is provided next to the pipette station 350, in particular such that the pipette station 350 is provided between the retainer 310 and the pipette disposal station 360.

In FIG. 9 it is also shown that the apparatus 300 may comprise a pump or pumps 370, substantially corresponding to the pump 170 of the apparatus 100. What was said with respect to the pump 170, thus, applies to the pump 370 correspondingly, if not otherwise stated. The pump 370 differs from the pump 170, in particular, in the arrangement inside of the apparatus 300. More specifically, the pump 370 is provided next to the retainer 310, preferably behind the pipette station 350 and/or the pipette disposal station 360 and/or in the back of the apparatus 300.

The apparatus may further comprise a reading unit 385, e.g. a QR-, Barcode-, or RFID-Reader, substantially corresponding to the functionality of the reading unit 285. Preferably, the reading unit 385 is provided in the retainer 310 in the front of the apparatus 300.

As can be seen in FIG. 8, the apparatus 300 may also comprise a printing unit 380 substantially corresponding to the printing unit 180. What was said with respect to the printing unit 180, thus, applies to the printing unit 380 correspondingly, if not otherwise stated. The printing unit 380 may be provided in the apparatus 300 correspondingly to the printing unit 180. The printing unit 380 may comprise a slot 383 being provided in a front of the apparatus 300, wherein by way of the slot 383 a printed label can be issued out of the apparatus 300.

As can be seen in FIG. 9, the apparatus 300 may further comprise a motor or motors 390, which correspond in their functionality and preferably in their arrangement with respect to the printing unit 300 substantially to the motors 191, 192. The motors 390 may be provided next to the pipette disposal station 360, in particular with the motors 390 between the pipette station 350 and the pipette disposal station 360.

FIG. 8 shows exemplarily that the apparatus 300 may also comprise an output 335 for outputting the new flavoring agent. The output 335 substantially corresponds to the output 135. What was said with respect to the output 135 thus applies to the printing unit 335 correspondingly, if not otherwise stated. With respect to the mixer 330, the manipulator 320 may move the mixer 330 with respect to the output 335, so that mixer 320 is connected to the output 335. Thus, the new flavoring agent, e.g. provided in a new container, can be taken out of the mixer 330 and/or the apparatus 300.

Despite not shown in FIGS. 8 and 9, the apparatus 300 may also comprise a cooling unit. The cooling unit may substantially correspond to the cooling unit 150. What was said with respect to the cooling unit 150, thus, may apply to the cooling unit of the apparatus 200 correspondingly, if not otherwise stated.

As exemplarily shown in FIG. 8, the apparatus 300 may further comprise a housing 315. The housing 315 houses at least the retainer 310, the pipette station 350, the pipette disposal station 360, the cooling unit, the manipulator 320 and/or the mixer 330. More specifically, as shown in the preferred embodiment shown in FIG. 8, the housing 315 may be composed of two housing parts 316, 317. The housing part 316, which has preferably a substantially box-shaped form, houses at least and preferably only the retainer 310. The housing part 317, which has preferably a substantially box-shaped form, houses at least the control unit, the cooling unit, the pump 370, the printing unit 380 and/or the motors 390. The manipulator 320 is preferably provided in the housing 315 such that the manipulator 320 can move both in the housing part 316 and the housing part 317. For example, the guiding element 322 may extent from the housing part 316 to the housing part 317.

As can be seen, e.g., in FIG. 8, the housing 315 or the housing part 316 may be (partially) transparent, at least in the part of the part of the housing 315 housing the retainer 310, so that a user can observe the containers 10 in the apparatus 300 through this transparent part. The transparent part of the housing 315 may be provided by means of a window or cover 318. The transparent part of the housing may comprise at least one, preferably two, three or four sides of this part of the housing 315 or the housing part 316. The housing 315, in particular the housing part 316, may further comprise a preferably removable lid for selectively opening and closing the housing 315 for accessing the retainer 310 with the containers 10 inside of the housing 315. For example, the housing part 316 forms the lid 119.

As shown in FIG. 8, the apparatus 300 may also comprise a user interface or a display unit 341. By way of the display unit 341 the apparatus 300 may be maintained and/or processing parameters, e.g. of the mixer 330 and/or of the manipulator 320, may be monitored. The display unit 341 may also be adapted for adjusting the type and/or defined amount of a specific flavoring agent to be collected and dispensed. In the preferred embodiment shown in FIG. 8, the display unit 341 is provided on top of the apparatus 300, in particular on top of the housing part 317. The display unit 341 may also be a portable device, e.g., a tablet or smartphone, being connectable with the communication unit of the apparatus 300.

FIG. 10 shows exemplarily a preferred container 10 (i.e., input container) for the apparatus according to the present invention. The container 10 has a portable/handy size, which may be provided in different sizes, e.g. 7 cm high with a diameter of 3 cm. The container 10 may hold a certain amount of a liquid flavoring agent, e.g. between 10 g and 30 g and/or between 250 ml and 500 ml. The container 10 is designed to enable free spill refilling of the apparatus, easy change of the containers in the apparatus, safe shipping and storage, identification of the container by the control unit (e.g. to avoid errors in mixing formulations), protection of the flavoring agent against oxygen and light, connection with the collecting and dispensing unit, in particular the manipulator, to enable extraction of liquid.

The container 10 comprises a container body 11 for holding the flavoring agent and a lid 12 for sealingly closing the container 10, i.e. the flavoring agent inside of the container body 11. The lid 12 is thus adapted for being connected with the container body 11. The container 10 may substantially correspond to a dätwyler bottle or in general to a bottle known in the field of medicine or in any other field.

The container 10 has at least one opening on either bottom, side or top. The opening is configured to be closed during transport and storage and when attached to the apparatus in stand-by mode. For example, the opening opens when the manipulator of the apparatus extracts flavoring agent from the container. Preferably, the lid 12 is designed such that the container 10 or container body 11 is accessible for the manipulator. For example, the lid 12 is designed such that a pipette (e.g. a needlelike pipette) being held by the manipulator, a tube that is connected to the manipulator, or the nozzle of a die head can access the container 10 or container body 11. For example, the lid 12 may be made of elastic material, which opens, when the manipulator, in particular the pipette or needle, penetrates the elastic material. Furthermore, the elastic material automatically closes the lid 12, i.e. the part of the lid penetrated by means of the manipulator, when the manipulator is released from the lid and/or does not penetrate the lid 12 anymore. This may be accomplished by providing an elastic seal in the lid 12.

The container body 11 is preferably made of aluminum or any other metal. The invention is, however, not restricted to a specific material. The container body 11 may also be made of glass. It is preferred that the material of the container is does not interact with the flavoring agent contained in the container. The container 10 may be made of synthetic material, preferably LDPE, HDPE, PP, PMP, TFE and/or glass. The container 10, preferably its body 11, in particular the inner surface and/or outer surface of its body, may comprise a surface treatment such as a lamination.

The container 10, in particular its body 11, may have a substantially stiff structure or a substantially flexible structure, preferably designed as a pouch. In this case, the container 10 preferably comprises a stabilizing structure, e.g. a box, which surrounds the container, in particular the container body, for stabilizing the flexible structure.

Furthermore, the container 10, e.g. the bottom of the container body 11, may comprise mechanical and/or electronical elements, which may be coupled with corresponding mechanical and/or electronical elements of a retainer. With such mechanical and/or electronical elements it may be effected that the apparatus according to the present invention is only operable with specific containers (i.e. a "lock-in function"). The mechanical elements may have a specific geometry, so that the apparatus may only be operated in case the retainer of the apparatus comprises a corresponding geometry. Additionally or alternatively the electronical means may provide certain signals, wherein the apparatus is only operable in case corresponding receiving means in the retainer recognizes these signals as signals of a container, which is allowed to be used in the apparatus The container 10 may also comprise a tag, e.g. a barcode or an RFID tag, for identifying the specific container 10, in particular the content of the container 10 or other information about the components of the flavoring agent.

The output container—i.e. the container in which the new flavoring agent, which is outputted by the output 135, is provided—may have a design, which is similar or different to the design of the container 10. Preferably, the output container has a different design than the container 10, i.e. has in particular a different size, shape and/or lid. As such, the apparatus may comprise two types of containers. The main function of the output container is to receive the liquid flavoring agents that are transported by the manipulator from the "input containers", i.e. the containers 10. The function of the output container is also to act as a storage container for the new flavoring agent, e.g. a liquid from 10 g to 30 g. The output container is designed to protect the new flavoring agent from the environment, in particular from oxygen and spillage, and thus is preferably reversibly closeable, e.g. by a dedicated reclosing mechanism. The reclosing mechanism can for example be a valve or a slider.

The output container is composed of a bottom, a body, and a lid. The output container may be made of metal, preferably aluminium, and/or a synthetic material, preferably LDPE, HDPE, PP, PMP, TFE and/or glass. The output container, preferably its body, in particular the inner surface and/or outer surface of its body, may comprise a surface treatment such as a lamination.

The output container, in particular its body, may have a substantially stiff structure. Alternatively, the output container, in particular its body, may have a substantially flexible structure and is preferably designed as a pouch. In this case, the output container the container preferably comprises a stabilizing structure, e.g. a box, which surrounds the container, in particular the container body, for stabilizing the flexible structure.

The output container can also contain an identification tag or coding like an RFID tag or a barcode. The identification tag comprises, in particular, information about the content of the output container, i.e. information about the new flavoring agent. The information may relate to information about the components of the new flavoring agent, i.e. about the experiment. This allows having full traceability of the output container for downstream trials using the content of the output container when code readers are used. The identification tag or coding may also be used to verify if a container is placed in the output. Thus, the output 135 may comprise a reader, which is adapted to read the identification tag of the output container. The reader may further be configured to store information on the information tag, e.g. electronically on the RFID tag. The output 135 may comprise a printing unit that can print directly onto the surface of the output container. For example, the printing unit is adapted to print the identification tag, e.g. the barcode, onto the container.

FIG. 11 shows a preferred handling device 30 for the manipulator of manipulator head of the apparatus according to the present invention. The handling device 30 may be mounted at the head of the manipulator or form the head of the manipulator. The handling device 30 may be removably mounted to the head of the manipulator. The handling device 30 may adjust or dose the defined amount of flavoring agent, preferably with the accuracy of in steps of 0.05 g of the respective flavoring agent. Adjusting and dosing may be facilitated by means of the above described pressure differences. The handling device 30 is preferably a microdosing device for microdosing by way of the pipette. For microdosing, a micro pump 34 as shown in FIG. 12 may be used. Microdosing may further be supported by means of a microbalance 35 as shown in FIG. 13.

As shown in FIG. 11, the handling device 30 may comprise a receiving part 31 for receiving the pipette 32. The receiving part 31 may house components 33 for actuating the pipette and/or for grasping and/or releasing the pipette 32. The handling device 30, in particular the components 33, therefore may collect and dispense flavoring agents from a specific container to a mixer. The pipette 32 may be needle-like in order to provide the necessary stress for penetrating the lid 12 of the container 10.

The pipette station may comprise a pipette box 60 comprising the pipettes. In FIG. 14, a preferred pipette box 60 containing pipettes is shown. The pipette box 60 may be adapted to orientate the pipettes in the direction of the moving direction of the manipulator for grasping the pipette, so that the manipulator does not need to adapt its orientation with respect to the respective pipette. In particular, the pipettes may be orientated parallel to the movement direction of the manipulator, which is usually a vertical direction with respect to the apparatus or the pipette box 60.

In the following, the control unit as well as the communication unit is further described with respect to the above described embodiments of the apparatus 100, 200, 300.

The control unit of the apparatus 100, 200, 300 is configured such that the control unit can at least control the manipulator 120, 220, 320 and the mixer 130, 230, 330. The control unit is configured to control the manipulator 120, 220, 320 to collect and dispense a first defined amount of flavoring agent from a first container 10 to the mixer 120, 220, 320. In particular, the defined amount of the flavoring agent is adjustable by the user of the apparatus 100, 200, 300. That is, a user chooses a first defined amount of a specific flavoring agent, e.g. by way of the user interface of the apparatus 100, 200, 300, wherein the control unit receives this specific amount of a specific flavoring agent and, thus, controls the manipulator 120, 220, 320 such that the manipulator 120, 220, 320 reaches the specific container containing the specific flavoring agent. Subsequently, the manipulator 120, 220, 320, in particular the pipette and/or the manipulator head, accesses the specific container 10 for collecting the specific/desired amount of the specific/desired flavoring agent. Subsequently, the control unit controls the manipulator 120, 220, 320 such that the manipulator 120, 220, 320 dispenses the first defined amount of flavoring agent to the mixer 130, 230, 330 such that this first defined amount of flavoring agent is inside of the mixer 130, 230, 330.

After the first defined amount of flavoring agent has been dispensed to the mixer 130, 230, 330, a second defined amount of flavoring agent is collected. Usually, the user of the apparatus 100, 200, 300 chooses the second flavoring agent, i.e. in particular adjusts the defined amount and the type of the flavoring agent. The second amount of flavoring agent may also be defined or adjusted by means of the user interface of the apparatus 100, 200, 300. The control unit receives this input from the user and subsequently controls the manipulator 120, 220, 320 such that the manipulator 120, 220, 320 reaches the container including this specific flavoring agent. Subsequently the manipulator 120, 220, 320 accesses the specific container 10 and collects the defined amount of flavoring agent from this specific (second) container 10. After that, the control unit controls the manipulator 120, 220, 320 such that the manipulator dispenses this second defined amount of the specific flavoring agent to the mixer 130, 230, 330.

The above process for dispensing the first and second defined amount of flavoring agent to the mixer 130, 230, 330 can be repeated for further flavoring agents of the containers 10, in particular for further one, two, or more, in particular further 18 or 22 containers. In other words, the apparatus 100, 200, 300 may mix up to 20 or more different flavoring agents. The apparatus 100, 200, 300 may in particular be adapted to allow at least 30 preparations of new flavoring agents without requiring intervention such as refilling the containers or cleaning.

After the manipulator 120, 220, 320 has dispensed the first and second defined amount of flavoring agents from at least two different containers, the control unit controls the mixer 130, 230, 330 such that the first and second and preferably the further defined amount of flavoring agent inside of the mixer 130 are mixed. Thus, a new flavoring agent is produced. The new flavoring agent can then be automatically provided in a new container, e.g. by means of the manipulator 120, 220, 320. The user of the apparatus 100, 200, 300 may take the new flavoring agent out of the apparatus 100, 200, 300, e.g. by way of the output 135, 235, 335. The new flavoring agent may be a liquid with a quantity of between 10 g and 30 g. The apparatus 100, 200, 300 may require 90 seconds for the preparation of such a new flavoring agent. Subsequently, the user may evaluate the new flavoring agent. If required, the user can iterate/repeat the above steps for further new flavoring agents, e.g. for finding a specific flavoring agent for a specific new product.

In the preferred embodiment of the apparatus 100, 200, 300 comprising the pipette station 160, 250, 350, the control unit may further be configured such that the manipulator 120, 220, 320 reaches the pipette station 160, 250, 350 for taking or collecting a first pipette, e.g. by means of the handling device 30. The control unit then controls the manipulator 120, 220, 320 such that the manipulator 120, 220, 320 collects the first defined amount of flavoring agent from the first container by means of the first pipette. Subsequently, the control unit controls the manipulator 120, 220, 320 such that the manipulator dispenses the first defined amount of flavoring agent from the first pipette into the mixer 130, 230, 330, e.g. by directly dispensing in the mixer 130, 230, 330 or by indirectly dispensing in the mixer 130, 230, 330 by way of the fluid connection. After that, the control unit controls the manipulator 120, 220, 320 to dispose of the first pipette, e.g. in the pipette disposal station 260, 360.

After the first defined amount of flavoring agent has been dispensed to the mixer 130, 230, 330, the control unit controls the manipulator 120, 220, 320 such that the manipulator 120, 220, 320 reaches the pipette station 160, 250, 350 for taking or grasping a second pipette from the pipette station 160, 250, 350 in the manner as described above. Subsequently, the control unit controls the manipulator 120, 220, 320 such that the manipulator 120, 220, 320 or the second pipette reaches the specific container for collecting the second defined amount of flavoring agent from the second container by means of the second pipette. After that, the control unit controls the manipulator 120, 220, 320 such that the manipulator 120, 220, 320 or the second pipette dispenses the second amount of flavoring agent from the second pipette into the mixer 130, 230, 330, e.g. by directly dispensing in the mixer 130, 230, 330 or by indirectly dispensing in the mixer 130, 230, 330 by way of the fluid connection. Then, the mixer 130, 230, 330 mixes the first and second defined amount of flavoring agents inside of the mixer 130, 230, 330 as described above for obtaining the new flavoring agent. Furthermore, the control unit controls the manipulator 120, 220, 320 such that the manipulator 120, 220, 320 disposes of the second, i.e. the used pipette, e.g. in the pipette disposal station 260, 360.

The apparatus 100, 200, 300 may further comprise a communication unit for preferably wireless communication (e.g., DSL, mobile communication, and/or short distance communication technology such as Bluetooth and/or Wi-Fi) with a remote server and/or a remote device. The remote server is generally accessible by way of an internet connection and is often also referred to as a cloud. The communication unit may be integrated in the control unit or the PCB. The communication unit may alternatively or additionally be configured to be preferably wirelessly connectable with a remote device such as a user interface 20, which may be a portable device, e.g., a tablet or smartphone, having an operating system, e.g. Android or iOS (see, e.g., FIGS. 1 and 8). The remote device may, additionally or alternatively, be another apparatus 100, 200, 300 in order to provide communication between two or more apparatus.

The remote device or user interface 20 may be adapted to choose the type or container of a flavoring agent and/or to control or adjust the defined amount of a respective flavoring agent or the ratios of the flavoring agents of the new flavoring agent. The user interface may include a tool to guide the user through existing flavoring agents, in particular existing formulas, and/or to choose a recipe from a library, which is, for example, provided online on the remote server. The tool may be adapted to filter criteria with respect to the flavoring agents like tonality, sensory profile, application type, regulatory status, price, personal collection, and/or favorites of the user. The tool may also support the user in the creation of a new flavoring agent, in particular a new formula. In other words, the user may tune the new flavoring agent or formula by means of the tool or the remote device/user interface. For example, the user may adjust the relationship between the sensory attributes and/or formulas. The user interface 20 may be adapted to follow the activity of the apparatus (e.g. process progress), to see the sensory profile calculated and sent by the remote server, and/or to enter comments, such as sensory feedback. Preferably, the communication unit comprises the user interface.

For example, the user interface 20 may comprise a selection page for adjusting and/or displaying the defined amounts of flavoring agent. The selection page may comprise a plurality of panels, e.g. from 10 to 20 panels, wherein each panel at least displays the respective defined amount of flavoring agent to dispense to the mixer. The user interface 20 may be configured to display a (graphically displayed) input unit for inputting parameters of the apparatus, e.g. for adjusting/inputting the defined amounts of flavoring agent. For example, the input unit comprises a keyboard, a numeric keypad and/or a list of predefined parameters, e.g. recipes.

Preferably, the user interface 20 facilitates one or more of the following: saving recipes of a flavoring mix with a custom name; loading previous recipes, e.g., for quick repeat tests with slight variations in doses; tracking of the total weight of the new flavoring agent, and/or limiting/adjusting a total weight value, e.g. to 30 g, so no dispenses can occur if the value is above this; dispensing the flavors, e.g. by a dedicated dispense button to begin dispensing the flavors; dispensing progress wheel animation and/or displaying a percentage value for the whole dispensing progress; displaying a dedicated progress animation, such as a progress wheel, for each of the flavoring agents to be dispensed, wherein the animation preferably ticks to show when it is complete; displaying out, e.g. greying out, unused flavoring agents; changing of the color of the dispense progress animation and indicating once the dispense is complete; recording each dispense in a database with the amount(s) dispensed for all containers/flavoring agents used, e.g. 10 or 20 flavoring agents/containers (bays), along with date/time, dispense number and recipe name. An exemplary user interface 20 may comprise a graphic representation for displaying and/or adjusting the sensory attributes (bitterness, body, creaminess, fruitiness (citrus fruit, tropical fruit, stone fruit, etc.), sweetness (e.g., honey) and/or other attributes such as floral flavor) of flavoring agents (e.g. provided in the containers) and/or of the new flavoring agent (mix).

The user interface 20 is preferably configured such that the user can enter via a wish sensory profile of the new flavoring agent, e.g. in a user interface 20 in which the sensory profile is presented graphically. The sensory profile may be expressed with scores for a selected list of sensory descriptors. The wish profile can be forwarded to the communication unit to be sent to the remote server. The remote server can also send a sensory profile to the apparatus. For example, a sensory profile for a flavoring agent mixture may be according to the following table.

| Code | Amount | | | | |
|---|---|---|---|---|---|
| Fruity342 T | 91% | 17% | 17% | 17% | 9% |
| Green346 T | 0% | 74% | 0% | 0% | 48% |

-continued

| Code | Amount | | | | |
|---|---|---|---|---|---|
| Floral348 T | 0% | 0% | 78% | 0% | 35% |
| Vanillic350 T | 0% | 0% | 0% | 78% | 0% |
| Filler000 T | 9% | 9% | 4% | 4% | 9% |
| | fruity-ts-m-001 | fruity-green-ts-m-002 | floral-fruity-ts-m-003 | vanillin-fruity-ts-m-004 | green-floral-fruity-ts-m-005 |

The communication unit is, in particular, configured for communicating data with the remote server and/or the remote device. Such data may include type or composition of the first and second defined amount of flavoring agent. The control unit may comprise sensors or the like for recognizing which type or composition of flavoring agent is provided inside of the respective containers. Using the information of these sensors or readers, the control unit may forward this information to the communication unit, which thus forwards this data to the remote server and/or the remote device, e.g. the user interface 20. The same may apply, additionally or alternatively, to the type or composition of the new flavoring agent. Also processing parameters such as temperature, pressure or the like of the flavoring agents may be sensed by the control unit, forwarded to the communication unit and subsequently transferred to the remote server and/or the remote device. Also other data such as user data and/or filling level of the containers, and/or other inputs may be sensed by the control unit 140 forwarded to the communication unit, and thus to the remote server and/or the remote device.

FIG. 15 exemplarily shows a system 40, which additionally to the above described apparatus 100, 200, 300 comprises a remote server 41, e.g. the above remote server. The remote server 41 may be configured to receive (electronic) data (packages), in particular the above data of the communication unit, from the apparatus 100, 200, 300. The remote server 41 is then configured to send data 42 to the apparatus. This data 42 being sent to the apparatus 100, 200, 300 is then based on the (electronic) data (packages) 43 sent by the apparatus 100, 200, 300 or its communication unit and received by the remote server 41.

For example, the apparatus 100, 200, 300 may send data 43 including type and/or composition of the first and second defined amount of flavoring agent and/or the composition of the new flavoring agent, wherein the remote server 41 may generate data 42 based on this data 43. The data 42 may then include data including type and/or composition of a recommended flavoring agent. The recommended flavoring agent may then be (automatically) sent, e.g. with a package 44, to the user of the apparatus 100, 200, 300. As such, a user using the apparatus 100, 200, 300 and the system 40 may rapidly find the right flavoring agent for his requirements without using much resources in the apparatus 100, 200, 300. The apparatus 100 can thus be made very efficient, in particular without the usage of much computing power, since the computing power of the apparatus 100, 200, 300 can be outsourced to the remote server 41. In an example of the system, the system 40, in particular the remote server 41, calculates a sensory profile based on the new flavoring agent, which was produced by the apparatus by selecting a blend of at least two flavoring agents from the containers. Thus, the apparatus is not busy with calculating the sensory profile, and the apparatus can thus be made more efficient.

Based on the data 43 sent by the apparatus 100, the remote server 41 may also compute and subsequently sent data 42 including processing indicators and/or processing parameters. The processing indicators and/or processing parameters may relate to crucial parameters and/or characteristics of the flavoring agent such as composition or other chemical indicators and/or characteristics. It is therefore possible for the user of the apparatus 100, 200, 300 to efficiently compute these indicators and/or parameters, namely by way of the remote server 41 having more computing power than the apparatus 100, 200, 300. The data 42 being sent by the remote server 41 and received by the apparatus 100, 200, 300 may also include maintenance data. It is therefore also possible to easily maintain the apparatus 100, 200, 300 remotely.

The apparatus 100, 200, 300 may further comprise a display unit being configured to communicate with the remote server. The display unit may be integrated in the remote device, e.g. the user interface 20, the display unit 141 and/or the portable device. The display unit may also be connectable to a portable device, e.g., a tablet or smartphone, and/or connectable with the communication unit, e.g., via short haul communication technology such as Wifi or Bluetooth. By way of the display unit, a user of the apparatus 100, 200, 300 may, in particular, communicate with a display unit on a side of the remote server 41. For example, a user of the apparatus 100, 200, 300 may communicate with a user on a side of the remote server, e.g. with an expert for supporting the user in finding a composite flavoring agent and/or with a maintenance person for supporting the user in maintaining the apparatus. The communication may be facilitated by way of digital communication such as a chat and/or a video chat. The user of the apparatus 100, 200, 300 can thus instantly receive information with respect to the apparatus 100, 200, 300 and/or the use of flavoring agents.

FIGS. 18A-D show a further embodiment of an apparatus 400 according to the present invention. What was said with respect to the apparatuses 100, 200, 300 applies correspondingly to the apparatus 400, if not otherwise stated in the following.

The apparatus 400 differs from the apparatuses 100, 200, 300 in particular in that the apparatus 400 comprises at least two collecting and dispensing units, i.e. at least a first and a second collecting and dispensing unit. For each of the at least two containers 10, a dedicated collecting and dispensing unit is provided so that the first and the second defined amount flow at least partially and preferably entirely along independent flow paths. Each of the at least two collecting and dispensing units may comprise a respective tube for being fluidly connected to the respective container 10 so that the respective flavoring agent flows via this tube for being collected and subsequently dispensed to the mixer 130.

As can be seen in FIGS. 18A-D, in particular in FIGS. 18D and 18E, the apparatus 400 preferably comprises only two pumps 410 for the plurality of collecting and dispensing units being provided for the plurality of containers 10, e.g. more than two collecting and dispensing units. In other examples, the apparatus 400 comprises a single pump 410 for both the first and the second collecting and dispensing unit, i.e. for all the collecting and dispensing units. The pumps 410 are arranged to provide mechanical action so that the collecting and dispensing units can collect and dispense the respective flavoring agent, e.g. the first and the second defined amount of flavoring agent. For example, the apparatus 400 comprises a (revolving switch) valve for each of the pumps 410, which can be moved at least between a first position and a second position; in case a single pump 410 is provided for a specific number of containers, the valve can thus be moved among a number of positions, which corresponds to the specific number of containers. In the first position, only the first collecting and dispensing unit is arranged to collect and dispense the first defined amount of flavoring agent from the first container to the mixer, wherein in the second position only the second collecting and dispensing unit is arranged to collect and dispense the second defined amount of flavoring agent from the second container to the mixer. For example, the respective tubes of the at least two collecting and dispensing units, which are fluidly connected to the respective containers 10, merge at a branching point into a single tube, which is fluidly connected to the mixer, wherein the valve is arranged at the branching point for selectively providing a fluid connection between the respective tubes and the single tube. With the valve being functionally connected to the control unit, the control unit can accordingly control the valve for being moved between the at least two positions.

The pump 410 is preferably a simple reciprocating pump, which works similar as a syringe. Thus, the pump 410 may comprise a plunger or a piston, and a barrel, wherein the plunger moves linearly along the inside of the barrel, allowing the pump 410 to take in the first or the second defined amount of flavoring agent into the barrel and subsequently expel the first or the second defined amount of flavoring agent from the barrel into the mixer, e.g. through a discharge orifice of the barrel. For example, the pump 410 comprises an inlet, which is fluidly connected to the above-mentioned single tube for taking in the first or the second defined amount of flavoring agent into the barrel, and which is designed to be closed during expelling of the flavoring agent from the barrel through the discharge orifice such that the respective flavoring agent is prevented from flowing (back) through the inlet. The pump 410 may be operated by a stepper motor, which preferably has a minimum resolution of 0.005 mm and/or a linear speed in the range from 0.017 mm/s to 5 mm/s. For example, the stepper motor is arranged to linearly move the plunger or piston for operating the pump 410.

FIGS. 19A-B show a further embodiment of an apparatus 500 according to the present invention. What was said with respect to the apparatuses 100, 200, 300, 400 applies correspondingly to the apparatus 500, if not otherwise stated in the following.

The apparatus 500 substantially corresponds to the apparatus 400, with the main difference that each of the at least two collecting and dispensing units comprises a respective pump 510, i.e. the first collecting and dispensing unit comprises a first pump, and the second collecting and dispensing unit comprises a second pump. Thus, the retainer of the apparatus may comprise the pumps, e.g. integrated in the retainer or at least housed in the retainer. As shown in FIGS. 17B and 17C, having each of the at least two collecting and dispensing units to comprise a respective pump 510, the respective pump 510 may be integrally provided with the container 10. For example, the pump 510 may comprise fastening means, which engage with corresponding fastening means of the container 10, e.g. by way of a snap fit. The pump 510 may be received at the container body or in a housing of the container 10. FIGS. 19D and 19E exemplarily show another example of a container 10, which has the pump 510 integrally provided. The pump 510 may be provided at the bottom of the container 10. the bottom of the container 10 comprises preferably the tube, which fluidly connects the container 10 with the respective collecting and dispensing unit. The stabilizing structure 13 of the container 10, e.g. a metal cover, may engage with the pump 510, wherein the flexible pouch 14 being housed by the stabilizing structure 13 is positioned in or by the pump 510. Preferably, the pump 510 is a peristaltic pump, which can be arranged with respect to the container 10 in a very compact manner. An exemplary peristaltic pump is described in WO 2015/082917 A2. The pump 510 may be driven/operated by a stepper motor as described above with respect to the pump 410.

In FIGS. 20A and 20B a further embodiment of an apparatus 600 according to the present invention is shown. What was said with respect to the apparatuses 100, 200, 300, 400, 500 applies correspondingly to the apparatus 600, if not otherwise stated in the following.

The apparatus 600 substantially corresponds to the apparatus 500, with the main difference that the retainer 610 is differently arranged. The retainer 610 is arranged on the top of the apparatus 600 and in a slightly inclined manner. As shown in FIG. 20A, The retainer 610 is preferably inclined towards a usage side of the apparatus 600, from which a user operates the apparatus 600, e.g. controls the display or control unit. Thus, a very convenient use of the apparatus 600 is provided, while the apparatus 600 is reduced in size, in particular comprises a reduced height. As for the apparatus 500, the apparatus 600 comprises the pumps 510 to be provided with respect to the retainer 610, e.g. integrated in the retainer 610 or with the container 10 (as shown in FIGS. 19D and 19E) or at least housed in the retainer 610. As can be seen in FIG. 20A, each of the pumps 510 may comprise a respective motor 511, e.g. a stepper motor as described above, which is provided on a backside of the retainer 610, wherein on a frontside of the retainer 610 (i.e. the side of the retainer 610 being opposite to the backside) the containers 10 and preferably the pumps 510 are provided. Thus, the motors 511 can be provided inside of the housing of the apparatus 600 and in a very compact manner. As shown in FIG. 20C, the retainer 610 may be arranged such that the retainer 610 can be removed from the apparatus 600, in particular without a tool. Preferably, the motors 511 remain in the housing, when the retainer is removed from the apparatus 600 respectively the motor drive shafts of the motors 511. As such, different trays or retainers comprising different containers of flavoring agents (flavor ingredients) can be easily interchanged.

FIG. 20B shows a preferred arrangement of the at least two collecting and dispensing units, which in this preferred embodiment of the apparatus 600 are 20 collecting and dispensing units for 20 containers 10. Each of the at least collecting and dispensing units comprises a respective tube, which fluidly connects the respective container 10 with the mixer, e.g. via a nozzle outlet; preferably each of the tubes comprises a respective nozzle outlet so that, for example, 20 individual nozzles are provided in total. The respective tubes are routed with respect to the retainer 610, e.g. inside the retainer 610, and between adjacent containers 10. The tubes may be provided with respect to the apparatus and/or the retainer such that tubes can be easily accessed without disassembling the retainer. Thus, an easy replacement by an operator is achieved. Preferably, the individual tubes run together at a single tube guiding element 611, e.g. in the form of a duct. Thus, the tubes can be effectively arranged to one another and in the apparatus 600. The guiding element 611 may comprise a cover for covering the tubes, which are guided by the guiding element 611.

FIG. 20A exemplarily shows the arrangement of components of the apparatus 600 inside of the housing of the apparatus. The housing may house at least the printing unit 620, a compressor unit 630 (e.g., for the pumps 510), electronic components 640 of the apparatus 600, e.g. the control unit, a condenser unit 650 and/or a cooling unit 660, e.g. a fan. The housing may have an inclined form, which forms an inclined part of the housing and provides the inclination of the retainer 611. Thereby, the housing comprises a back part, which has a higher height than a front part of the housing. Since the condenser unit 650 is usually a comparatively spacious and in particular high component of the apparatus 600, it is preferred that the condenser unit 650 is provided in the back part of the housing. Thus, a very compact arrangement is achieved. The cooling unit 650 is preferably provided in the back part of the housing, in particular at the backside of the housing. The condenser unit 650 may be provided between the electronic components 650 and the cooling unit 660. Thereby, the electronic components 640, the condenser unit 650 and the cooling unit 660 are effectively arranged to one another without requiring much space in the housing. Furthermore, an improved functioning of the condenser unit 650 and of the electronic components 640, in particular an improved cooling of the electronic components 640, is effected.

As shown in FIG. 20A, the output 635, which substantially corresponds to the output 135, 235, 335 as described herein above, may comprise a balance or scale 670 for weighing the output container, in particular the new flavoring agent inside of the output container. The balance 670 may be provided in a bottom of the output 635, on which the output container is provided. The balance may be an electronic balance, which can record the weight value in an electronic form and preferably then forwards this value to the (central) control unit for further controlling the apparatus, in particular the dosing operation of the collecting and dispensing unit.

FIGS. 21A and 21B as well as FIGS. 22A and 22B show further embodiments of an apparatus according to the present invention, which substantially corresponds to the apparatus 600. The main difference of these apparatuses is the shape of the housing.

As shown in FIGS. 21A and 21B, the housing of the apparatus may have a substantially cylindrical form, which due to the inclined retainer has the form of an obliquely cut cylinder. Thus, the retainer may retain the containers 10 in a circular manner. The base of the housing has the circular shape of the cylinder. In other words, the symmetrical axis of the cylinder goes through the retainer.

As shown in FIGS. 22A and 22B, the housing of the apparatus may have the form of a cylinder, wherein the symmetrical axis of the cylinder is not going through the retainer, but is preferably parallel to the retainer. As such, the circular shape of the cylinder can be seen in a side view of the apparatus, wherein—due to the inclined retainer—this circular shape has the form of a circle with a cut off segment of the circle. This form of the housing is particularly advantageous for adapting the inclination of the retainer, e.g. by rotating the housing about the symmetrical axis of the housing. In this embodiment, the retainer preferably retains the containers 10 in a grid manner.

FIGS. 23A-E show a further embodiment of the apparatus, which substantially corresponds to the apparatus 500 described herein above. Comparing, for example, FIGS. 23A and 23B with FIG. 19A, it is apparent that the apparatus 500 comprises a door for selectively covering the containers 10 or providing an access to the containers 10. Preferably, the door can be opened to the usage side of the device, e.g. to the front side of the device. Subsequently, the containers 10 of the retainer can be removed from the retainer and inserted in the retainer along a direction towards the usage side, e.g. the same direction, in which the door opens and closes. The door may also comprise an opening for accessing the output of the apparatus. The door may comprise the display unit.

The dimension of the apparatus can be made very compact, thereby facilitating that the apparatus can be mounted in a freestanding manner (e.g. on a ground or floor of a laboratory or factory) or counter mounted manner (e.g. on a work bench or any other table), particularly advantageous for laboratories or factories. Thus, the apparatus may be configured to be transported by a transport mechanism for transporting the apparatus, or the apparatus may comprises a transport mechanism for transporting the apparatus.

For example, the transport mechanism may be a container for transporting the apparatus. The apparatus may be integrated in the container, which is preferably a shipping container having a standardized size such as an intermodal container. Thus, the apparatus and the container may together form a transportable laboratory. The apparatus may be arranged in the container such that the apparatus and a sidewall of the container define a room for a user to operate the apparatus. This room may be a corridor, which preferably extends longitudinally along the longitudinal extension of the container. The container respectively the transportable laboratory may be transportable by a truck or a plane or a ship. As such, the transportable laboratory may be transported to places or locations, which provide a not so good infrastructure.

Another example of the transport mechanism for easily transporting the apparatus is a case. The apparatus may have such a size that the apparatus can be housed by the case, in particular a case having wheels for moving the case on the ground (e.g., two or four wheels), i.e. a wheely case. Thus, the apparatus can be such transportable/portable that a single person can handle/transport the apparatus. The case may be in the design of a suitcase. The apparatus may be integrated in the case such that by opening the case the apparatus is ready for booting and subsequent operation. For example, the case may be opened and directly placed on a location, e.g. on a table, such that the apparatus can be used on this location. The case may at least partially form the housing of the apparatus for integrating the apparatus in the case. The case may enclose the apparatus by (only) two parts or halves, which are connected to one another such that the two parts can be rotated to one another about a rotation axis. For example, the case comprises a hinge, which connects the two parts to one another and which provides the rotation axis. As such, a first half of the apparatus may be provided in one of the parts of the case, wherein a second half of the apparatus may be provided in the other one of the parts of the case.

The apparatus preferably uses mainly materials, which are compatible with Propylene Glycol and/or Citric Acid 1M (pH 2.95). The apparatus is, however, not restricted to a specific material.

An apparatus, a system, a process as well as a corresponding container are thus provided, which can be easily adapted to the needs of the customer and/or the (major) supplier. In particular, the apparatus and the system may be provided in business to business solutions as well as in customer to business solutions or even in customer to customer solutions. With the above described configuration of the apparatus, a scalable solution is provided. Furthermore, due to producing of the new flavoring agent on the side of the apparatus and, thus, on the side of the customer, in particular waste and shipping costs on the side of the supplier are reduced. The supplier as well as the customer can therefore focus on other high value tasks.

The apparatus provides an efficient means for producing a new flavoring agent. For example, the apparatus facilitates that the preparation of a new flavoring agent takes a maximum of 90 seconds; that is, the apparatus is ready for a new preparation within a maximum of 90 seconds. The apparatus according to the invention does not require interventions such as refilling or cleaning, while ensuring no cross-contamination, in particular during 10 different preparations. The apparatus also effects that a maximum of 1% of contamination of residual ingredients is present. The collecting and dispensing unit of the apparatus allows a very precise dosing, in particular with a dosing accuracy of 0.01 g of the ingredients. Due to the described arrangements of the components of the apparatus, it is also ensured that these components do not react with the liquids of the preparation, thereby improving the availability of the apparatus.

It should be clear to a skilled person that the embodiments shown in the figures are only preferred embodiments, but that, however, also other designs of an apparatus can be used. In particular, the manipulators, retainers, control units, mixers, cooling units, pipette stations, pipette disposing stations, housing parts, printer units, pumps, user interfaces, motors, outputs and solvent tanks of the embodiments can be arbitrarily combined and interchanged under each other.

The invention claimed is:

1. An apparatus for customized production of a flavoring agent, the apparatus comprising:

a retainer for retaining at least two containers, each container comprising a respective flavoring agent;

at least one collecting and dispensing unit for collecting and dispensing flavoring agents, a mixer for mixing flavoring agents for obtaining a new flavoring agent, a control-unit for controlling at least the collecting and dispensing unit and the mixer, and a communication unit for communicating with a remote server or remote device, wherein the control-unit is configured such that the collecting and dispensing unit collects and dispenses a first defined amount of flavoring agent from a first container to the mixer, the collecting and dispensing unit collects and dispenses a second defined amount of flavoring agent from a second container to the mixer, and the mixer mixes the first and second defined amount of flavoring agents inside of the mixer for producing the new flavoring agent;

wherein the apparatus comprises a housing for housing at least the retainer and the mixer, wherein the housing has a substantially cylindrical housing part and a substantially box-shaped or cubicle housing part, wherein the substantially cylindrical housing part houses at least the retainer and wherein the substantially box-shaped or cubicle housing part houses at least the mixer.

2. The apparatus according to claim 1, wherein the apparatus further comprises a cooling unit for cooling the containers.

3. The apparatus according to claim 1, wherein the apparatus further comprises an output for outputting the new flavoring agent, the new flavoring agent being filled in a new container by means of the collecting and dispensing unit.

4. The apparatus according to claim 1, wherein the retainer retains the containers in a circular or grid manner.

5. An apparatus according to claim 1, wherein the apparatus is configured to be transported by a transport mechanism for transporting the apparatus, or wherein the apparatus comprises a transport mechanism for transporting the apparatus.

6. An apparatus according to claim 5, wherein the transport mechanism is a container.

7. An apparatus according to claim 5, wherein the transport mechanism is a case.

8. An apparatus according to claim 5, wherein the apparatus is integrated with the transport mechanism.

* * * * *